(12) United States Patent
Song et al.

(10) Patent No.: US 8,288,450 B2
(45) Date of Patent: Oct. 16, 2012

(54) ADHESIVE COMPOSITION AND OPTICAL MEMBER USING THE SAME

(75) Inventors: Cheong Hun Song, Uiwang-si (KR); Hiroshi Ogawa, Kanagawa (JP); Tatsuhiro Suwa, Kanagawa (JP)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 28 days.

(21) Appl. No.: 13/158,857

(22) Filed: Jun. 13, 2011

(65) Prior Publication Data

US 2011/0245364 A1  Oct. 6, 2011

Related U.S. Application Data

(63) Continuation of application No. PCT/KR2009/007747, filed on Dec. 23, 2009.

(30) Foreign Application Priority Data

Dec. 25, 2008 (JP) ................................. 2008-330150

(51) Int. Cl.
*C08F 2/50* (2006.01)
*C08J 3/28* (2006.01)
*B32B 7/12* (2006.01)

(52) U.S. Cl. ................ 522/78; 522/71; 522/74; 522/81; 522/104; 522/107; 522/113; 522/114; 522/120; 522/121; 522/150; 522/153; 522/178; 522/182; 156/327; 428/355 R; 428/345; 428/343; 428/346; 428/349; 428/355 EN; 428/355 AC; 427/207.1; 427/208.4

(58) Field of Classification Search ............... 522/71, 522/74, 78, 81, 104, 107, 113, 114, 120, 522/121, 122, 150, 153, 178, 182; 156/327; 428/355 R, 345, 343, 346, 349, 355 EN, 428/355 AC; 427/207.1, 208.4
See application file for complete search history.

(56) References Cited

U.S. PATENT DOCUMENTS

| | | | | | |
|---|---|---|---|---|---|
| 3,376,224 | A | * | 4/1968 | Brazier et al. ................. | 508/252 |
| 4,749,612 | A | * | 6/1988 | Borkowski et al. ............ | 442/149 |
| 5,378,405 | A | * | 1/1995 | Gutman et al. ................ | 252/500 |
| 5,438,053 | A | * | 8/1995 | Sendai et al. .................. | 514/206 |
| 5,527,952 | A | * | 6/1996 | Kuroda et al. ................. | 560/262 |
| 5,547,753 | A | * | 8/1996 | Szita et al. ..................... | 428/357 |
| 5,563,224 | A | * | 10/1996 | Szita et al. ..................... | 525/480 |
| 5,605,986 | A | * | 2/1997 | Szita et al. ..................... | 525/509 |
| 5,612,084 | A | * | 3/1997 | Szita et al. ..................... | 427/160 |
| 5,621,052 | A | * | 4/1997 | Szita et al. ..................... | 525/509 |
| 5,883,147 | A | * | 3/1999 | Masuhara et al. .............. | 522/42 |
| 5,914,186 | A | * | 6/1999 | Yau et al. ....................... | 428/327 |
| 7,132,220 | B2 | * | 11/2006 | Arai et al. ................... | 430/287.1 |
| 2006/0207722 | A1 | * | 9/2006 | Amano et al. ................. | 156/327 |
| 2010/0188620 | A1 | * | 7/2010 | Kim et al. ....................... | 349/96 |

FOREIGN PATENT DOCUMENTS

| | | |
|---|---|---|
| JP | 2000-273417 | 10/2000 |
| JP | 2001-318230 | 11/2001 |
| JP | 2006-235568 | 9/2006 |
| JP | 2008-239965 | 10/2008 |
| JP | 2008-268535 | 11/2008 |
| JP | 2010072535 A * | 4/2010 |
| KR | 2008-0050398 | 6/2008 |

* cited by examiner

Primary Examiner — Sanza McClendon
(74) Attorney, Agent, or Firm — Lee & Morse, P.C.

(57) ABSTRACT

An adhesive composition and an optical member, the adhesive composition including 100 parts by weight of a polymer prepared by polymerization of (meth)acrylic ester containing monomers; 0.01 to about 3 parts by weight of an antistatic agent containing an ionic compound and/or a lithium salt; 0 to about 1 part by weight of a silane coupling agent; and about 3 to about 20 parts by weight of a benzotriazole group containing compound; and about 0.05 to about 5 parts by weight of a cross-linking agent, or about 3 to about 30 parts by weight of a multifunctional (meth)acrylate monomer, and 0 to about 5 parts by weight of an active energy-ray initiator.

11 Claims, 3 Drawing Sheets

FIG. 1

Table 3

| | | | | | | | | | | Synthesis example | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Composition of polymer (A) | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 | A-19 |
| Monomer (parts by weight) | BA | 99 | 89.9 | 99.5 | 97 | 90 | 95 | 92 | 82 | 83.7 | 93.3 | 99 | 90 | 99.1 | 95.3 | 92 | 99.3 | 91.5 | 94.9 | 84.5 |
| | 2EHA | | 10 | | | 5 | 3 | 4 | 9 | 15 | 5 | | 10 | | 4 | 7 | | 7 | | 10.1 |
| | HEA | 1 | | 0.5 | | | | | | 1 | | 1 | | 0.9 | | | | | 0.6 | |
| | 4HBA | | 0.1 | | 3 | 5 | 2 | | | | 1 | | | | | 1 | | 1 | | |
| | AA | | | | | | | 3 | 3 | 0.3 | 0.7 | | | | 0.7 | | 0.7 | 0.5 | 4.5 | 5.4 |
| Total (parts by weight) | | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 4500 | 5000 | 4000 | 3500 | 3000 | 4000 | 5000 | 3000 | 2500 | 2500 | 5000 | 2500 | 3000 | 4000 | 2500 | 4500 | 3000 | 4500 | 2500 |
| Solid content (%) | | 20 | 20 | 20 | 20 | 20 | 20 | 20 | 20 | 20 | 20 | 20 | 20 | 20 | 20 | 20 | 20 | 20 | 20 | 20 |
| Weight average molecular weight of polymer (A) | | 1.6 million | 1.7 million | 1.4 million | 1.3 million | 1.2 million | 1.4 million | 1.5 million | 1.2 million | 1.1 million | 1.4 million | 1.5 million | 1.2 million | 1.7 million | 1.7 million | 1.2 million | 1.7 million | 1.2 million | 1.7 million | 1.1 million |

FIG. 2

Table 4

| | | Example | | | | | | | | | | Comparative example | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 | 8 | 9 |
| A: polymer (A) | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 | A-19 |
| | | 100 | 100 | 100 | 100 | 100 | 100 | 100 | 100 | 100 | 100 | 100 | 100 | 100 | 100 | 100 | 100 | 100 | 100 | 100 |
| B: antistatic agent | Ionic compound 1 | 0.01 | | | | | | | | | | | 1 | 5 | | | 1 | 2 | | |
| | Ionic compound 2 | | 0.01 | | | | | | | | | | | | 1.8 | | | | | 0.5 |
| | Ionic compound 3 | | | 2 | | | | | | | | | | | | | | | | |
| | Ionic compound 4 | | | | 1 | | | | 1 | | 0.5 | | | | | | | | | |
| | Lithium salt 1 | | | | | 0.01 | 0.1 | | | | | | | | | | | | | |
| | Lithium salt 2 | | | | | | | 2 | | 1 | | | | | | 2 | | | 5.2 | |
| | Lithium salt 3 | | | | | | | | | | 1 | | | | | | | | | |
| C: silane coupling agent | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| D | D-1 | 5 | 5 | 5 | 20 | 10 | 3 | | | | | 5 | | | | | 30 | 25 | 8 | 2.1 |
| | D-2 | | | | | | | 10 | 10 | 15 | 15 | | | | 25 | | | | | |
| | D-3 | | | 5 | | | | | | | | | 0.05 | 2.0 | | | | | | |
| E | E-1 | 0.1 | 1.0 | 0.2 | | | 0.15 | 0.5 | 0.5 | 0.08 | 0.08 | 0.1 | | | 1.0 | 0.1 | 0.1 | | 0.5 | 0.5 |
| | E-2 | | | | | | | | | | | | | | | | | | | |
| F | F-1 | 5 | | 20 | 20 | 5 | 10 | | | 25 | 23 | 5 | 10 | | 10 | 5 | | 20 | | |
| | F-2 | 1 | 0.5 | 2 | | 3 | 4 | | | | 4 | 1 | 0.5 | 1 | 3 | 2 | | | | |
| G: Active energy-ray initiator | | | | | | | | | | | | | | | | | | | | |
| Gel content (%) of adhesive composition | | 72 | 95 | 90 | 69 | 88 | 92 | 72 | 83 | 67 | 93 | 71 | 75 | 66 | 92 | 77 | 70 | 82 | 63 | 62 |
| Performance Test | Surface resistance (Ω/sq) | $10^9$ | $10^9$ | $10^8$ | $10^7$ | $10^9$ | $10^9$ | $10^8$ | $10^8$ | $10^9$ | $10^9$ | $10^{15}$ | $10^{10}$ | $10^8$ | $10^8$ | $10^8$ | $10^9$ | $10^8$ | $10^9$ | $10^9$ |
| | Corrosion resistance | ○ | ○ | ○ | ○ | ○ | ○ | ○ | ○ | ○ | ○ | ○ | ○ | ○ | ○ | × | ○ | ○ | ○ | ○ |
| | Light leakage resistance | ○ | ○ | ○ | ○ | ○ | ○ | ○ | ○ | ○ | ○ | ○ | ○ | × | ○ | ○ | × | × | × | × |
| | Durability | ○ | ○ | ○ | ○ | ○ | ○ | ○ | ○ | ○ | ○ | ○ | × | × | × | × | × | × | × | × |
| | Adhesion (N/25mm) | 4 | 5 | 8 | 6 | 6 | 5 | 4 | 6 | 7 | 7 | 4 | 3 | 3 | 4 | 5 | 2 | 6 | 8 | 9 |
| | Cohesion to substrate | ○ | ○ | ○ | ○ | ○ | ○ | ○ | ○ | ○ | ○ | ○ | ○ | × | × | ○ | × | × | × | × |
| | Adherend contamination properties | ○ | ○ | ○ | ○ | ○ | ○ | ○ | ○ | ○ | ○ | ○ | ○ | × | × | ○ | × | × | × | × |
| | Low-temperature stability | ○ | ○ | ○ | ○ | ○ | ○ | ○ | ○ | ○ | ○ | ○ | ○ | ○ | × | ○ | × | × | × | × |
| | Reworkability | ○ | ○ | ○ | ○ | ○ | ○ | ○ | ○ | ○ | ○ | ○ | ○ | × | × | ○ | × | × | ○ | ○ |

ADHESIVE COMPOSITION AND OPTICAL MEMBER USING THE SAME

CROSS-REFERENCE TO RELATED APPLICATION

This application is a continuation of pending International Application No. PCT/KR2009/007747, entitled "Adhesive Composition and Optical Member Using the Same," which was filed on Dec. 23, 2009, the entire contents of which are hereby incorporated by reference.

BACKGROUND

1. Field

Embodiments relate to an adhesive composition and an optical member using the same.

2. Description of the Related Art

A display, one type of industrial product, is widely used with advances in IT and progress toward an information oriented society. Accordingly its role has become increasingly significant. Furthermore, with demand for lightweight and thin displays, flat panel displays are rapidly supplanting cathode ray tubes. Among various flat displays, e.g., a liquid crystal display, plasma display panel, electroluminescence, etc., the liquid crystal display is widely used for mobile phones, personal computers, and televisions.

Static electricity may be generated on flat displays, e.g., the liquid crystal display. The static electricity may attract dust in the air, may cause severe or irrecoverable damage, and may not be favorable in terms of safety. Static electricity may be produced when a surface protection film or a release film is peeled during fabrication of the liquid crystal display. The static electricity may damage nearby electronic components, thus causing defects in the liquid crystal display.

SUMMARY

Embodiments are directed to an adhesive composition and an optical member using the same.

The embodiments may be realized by providing an adhesive composition including 100 parts by weight of a polymer prepared by polymerization of (meth)acrylic ester containing monomers; 0.01 to about 3 parts by weight of an antistatic agent containing an ionic compound and/or a lithium salt; 0 to about 1 part by weight of a silane coupling agent; and about 3 to about 20 parts by weight of a benzotriazole group containing compound; and about 0.05 to about 5 parts by weight of a cross-linking agent, or about 3 to about 30 parts by weight of a multifunctional (meth)acrylate monomer, and 0 to about 5 parts by weight of an active energy-ray initiator.

The benzotriazole group containing compound may be a compound represented by at least one of the following Formulae I to V:

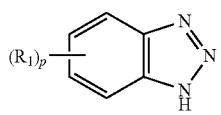

[Formula I]

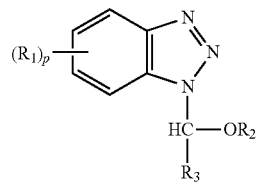

[Formula II]

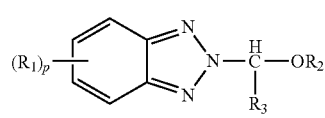

[Formula III]

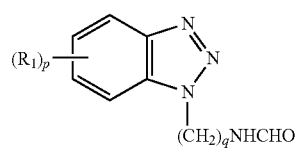

[Formula IV]

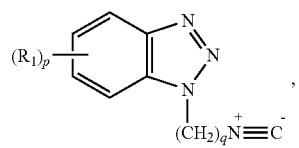

[Formula V]

wherein each $R_1$ independently represents a C1-4 alkyl or halogen, p is from 0 to 4; $R_2$ represents at least one of a C1-12 alkyl, a C5-7 cycloalkyl, a C5-7 cycloalkyl substituted by one to three C1-4 alkyl groups, and a C5-7 cycloalkyl-substituted C1-4 alkyl; $R_3$ represents at least one of hydrogen, a C1-12 alkyl, a C5-7 cycloalkyl, a C5-7 cycloalkyl substituted by one to three C1-4 alkyl groups, a C5-7 cycloalkyl-substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

The benzotriazole group containing compound represented by one of Formulae I to V may be represented by one of the following compounds:

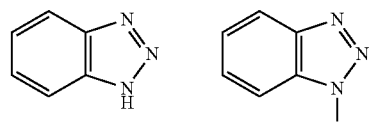

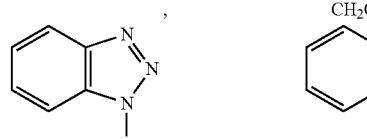

The embodiments may also be realized by providing an optical member including an adhesive layer prepared from the adhesive composition of an embodiment.

The benzotriazole group containing compound may be a compound represented by at least one of the following Formulae I to V:

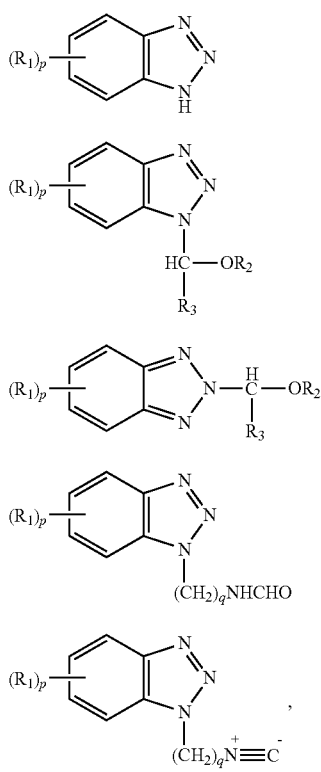

[Formula I]

[Formula II]

[Formula III]

[Formula IV]

[Formula V]

wherein each $R_1$ independently represents a C1-4 alkyl or halogen, p is from 0 to 4; $R_2$ represents at least one of a C1-12 alkyl, a C5-7 cycloalkyl, a C5-7 cycloalkyl substituted by one to three C1-4 alkyl groups, and a C5-7 cycloalkyl-substituted C1-4 alkyl; $R_3$ represents at least one of hydrogen, a C1-12 alkyl, a C5-7 cycloalkyl, a C5-7 cycloalkyl substituted by one to three C1-4 alkyl groups, a C5-7 cycloalkyl-substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

The benzotriazole group containing compound represented by one of Formulae I to V may be represented by one of the following compounds:

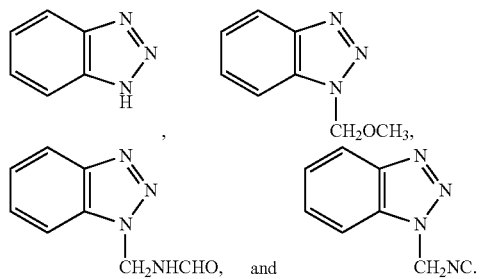

The embodiments may also be realized by providing an adhesive composition including 100 parts by weight of a polymer prepared by polymerization of (meth)acrylic ester containing monomers; 0.01 to about 3 parts by weight of an antistatic agent containing an ionic compound and/or a lithium salt; 0 to about 1 part by weight of a silane coupling agent; and about 3 to about 20 parts by weight of a benzotriazole group containing compound; and at least one of about 0.05 to about 5 parts by weight of a cross-linking agent, and about 3 to about 30 parts by weight of a multifunctional (meth)acrylate monomer.

The composition may include the multifunctional (meth)acrylate monomer and may further include an active energy-ray initiator, the active energy-ray initiator being present in an amount of up to about 5 parts by weight.

The benzotriazole group containing compound may be a compound represented by at least one of the following Formulae I to V:

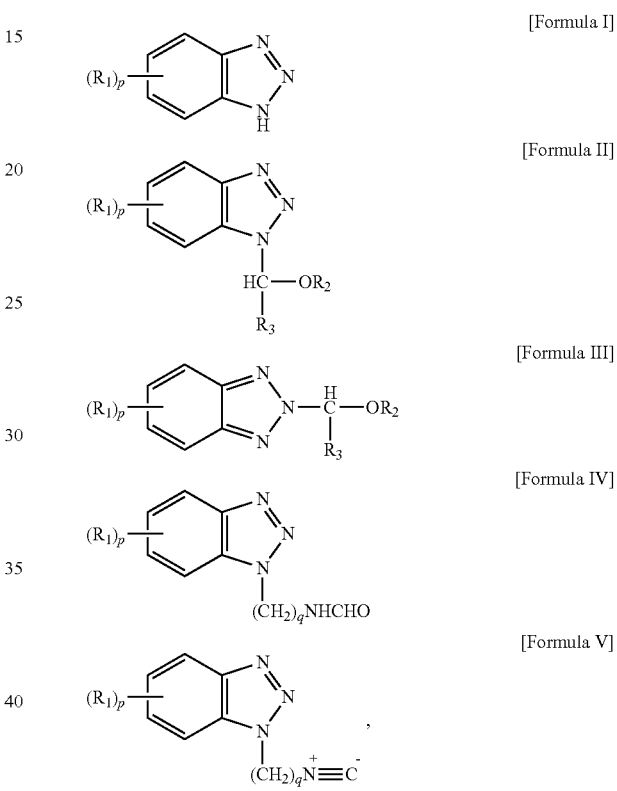

[Formula I]

[Formula II]

[Formula III]

[Formula IV]

[Formula V]

wherein each $R_1$ independently represents a C1-4 alkyl or halogen, p is from 0 to 4; $R_2$ represents at least one of a C1-12 alkyl, a C5-7 cycloalkyl, a C5-7 cycloalkyl substituted by one to three C1-4 alkyl groups, and a C5-7 cycloalkyl-substituted C1-4 alkyl; $R_3$ represents at least one of hydrogen, a C1-12 alkyl, a C5-7 cycloalkyl, a C5-7 cycloalkyl substituted by one to three C1-4 alkyl groups, a C5-7 cycloalkyl-substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

The benzotriazole group containing compound represented by one of Formulae I to V may be represented by one of the following compounds:

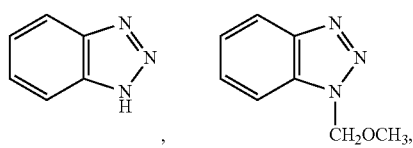

-continued

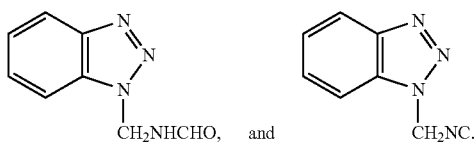
CH₂NHCHO, and CH₂NC.

The embodiments may also be realized by an optical member including an adhesive layer prepared from the adhesive composition of an embodiment.

The benzotriazole group containing compound may be a compound represented by at least one of the following Formulae I to V:

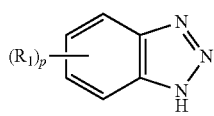
[Formula I]

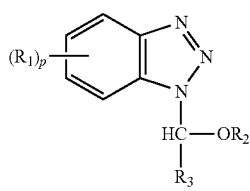
[Formula II]

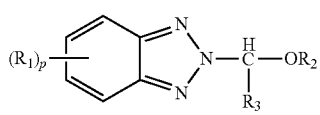
[Formula III]

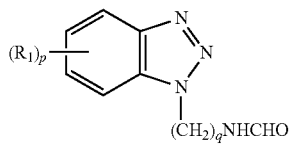
[Formula IV]

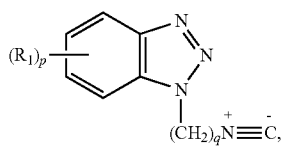
[Formula V]

wherein each $R_1$ independently represents a C1-4 alkyl or halogen, p is from 0 to 4; $R_2$ represents at least one of a C1-12 alkyl, a C5-7 cycloalkyl, a C5-7 cycloalkyl substituted by one to three C1-4 alkyl groups, and a C5-7 cycloalkyl-substituted C1-4 alkyl; $R_3$ represents at least one of hydrogen, a C1-12 alkyl, a C5-7 cycloalkyl, a C5-7 cycloalkyl substituted by one to three C1-4 alkyl groups, a C5-7 cycloalkyl-substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

The benzotriazole group containing compound represented by one of Formulae I to V may be represented by one of the following compounds:

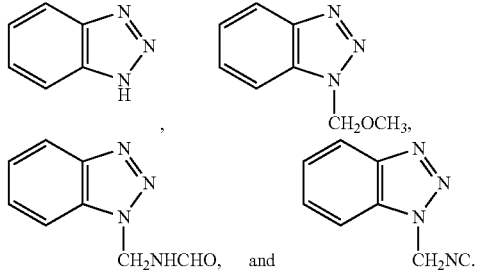
, CH₂OCH₃,
CH₂NHCHO, and CH₂NC.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates Table 3 listing components used to form the polymer (A) of Synthesis Examples 1-19;

FIG. 2 illustrates Table 4 listing components used in the adhesive compositions of Examples 1 to 10 and Comparative Examples 1 to 9 as well as performance test results.

DETAILED DESCRIPTION

Figure 3:
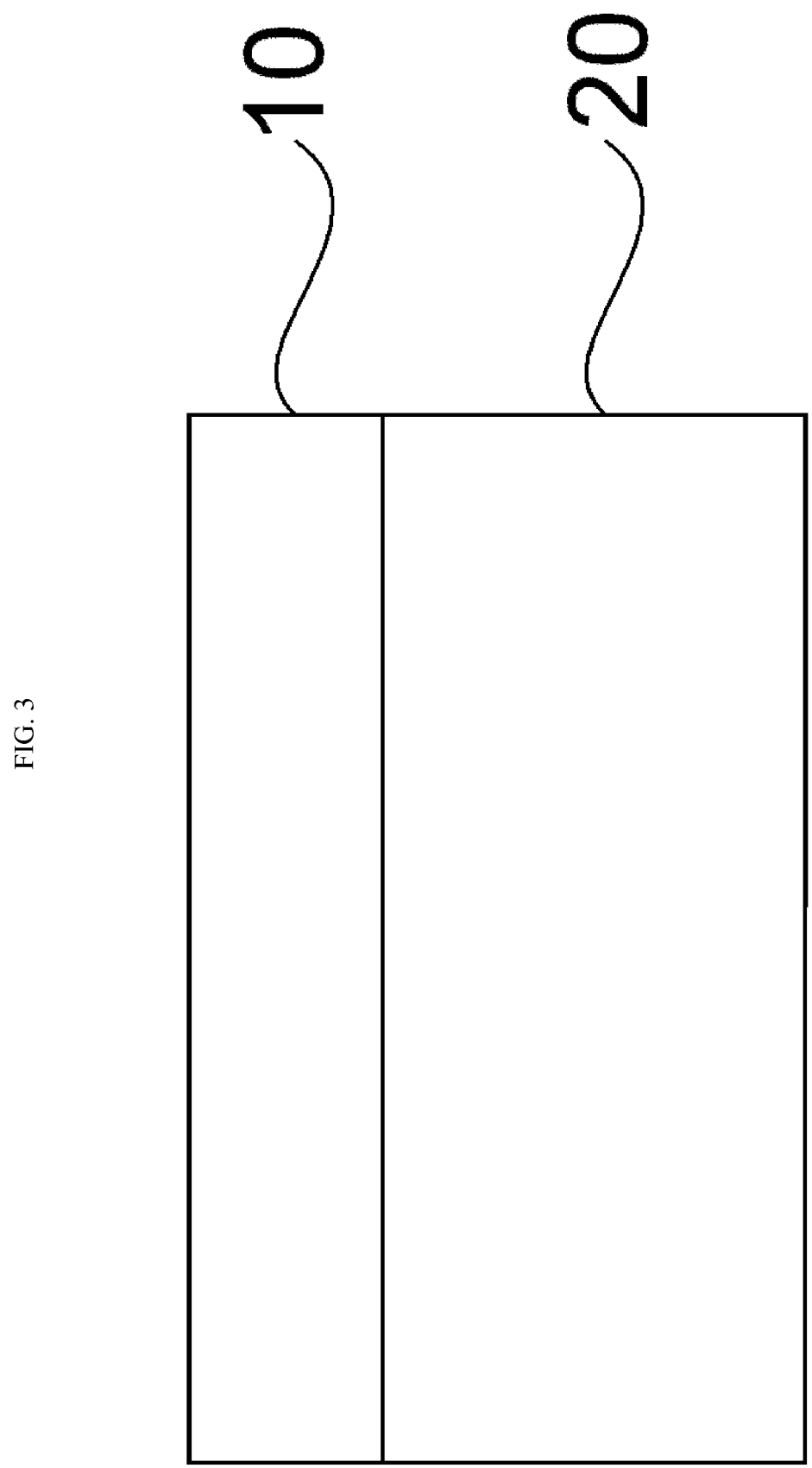
FIG. 3 illustrates a schematic cross-sectional view of an optical member according to an embodiment.

Japanese Patent Application No. 2008-330150, filed on Dec. 25, 2008, in the Japanese Intellectual Property Office, and entitled: "Adhesive Composition and Optical Member Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present.

The embodiments provide an adhesive composition including, e.g., 100 parts by weight of a polymer (A) (prepared by polymerization of (meth)acrylic ester containing monomers), about 0.01 to about 3 parts by weight of an antistatic agent (B) (containing an ionic compound and/or a lithium salt), 0 to about 1 part by weight of a silane coupling agent (C), and about 3 to about 20 parts by weight of a benzotriazole group containing compound (D). In an implementation, the adhesive composition may include about 0.05 to about 5 parts by weight of a cross-linking agent (E) or about 3 to about 30 parts by weight of a multifunctional (meth)acrylate monomer (F) and 0 to about 5 parts by weight of an active energy-ray initiator (G), e.g., a UV initiator.

The adhesive composition of an embodiment may be prepared by adding the benzotriazole group containing compound and the antistatic agent (containing an ionic compound and/or lithium salt) to a (meth)acrylic ester adhesive composition, e.g., an active energy-ray beam curable acrylic adhesive composition. As described above, static electricity may be generated in an optical member, e.g., a polarizing plate, due to friction occurring when a surface protection film is stripped or handled. When the optical member is applied to a liquid crystal display, static electricity may cause damage. Moreover, static electricity may cause, e.g., malfunction, memory destruction, and other damage in electronic/electric equipment, OA equipment, etc. Therefore, an antistatic layer may be installed separately from an adhesive layer in order to suppress the attraction of dirt or dust and static electricity by preventing static electricity. However, the method of using a separate antistatic layer and adhesive layer may not be desirable in view of a resultant thickness and/or may lead to a complicated manufacturing process.

Thus, according to the embodiments, the benzotriazole group containing compound and the ionic compound and/or lithium salt may be added to an adhesive composition, thereby imparting antistatic performance to an adhesive layer as well as achieving a low surface resistance, e.g., less than about $1 \times 10^{10}$ Ω/sq. If metal is present near the adhesive composition, e.g., under a high-humidity atmosphere, the use of the lithium salt or (meth)acrylic/(meth)acrylic ester polymer in the adhesive composition could cause corrosion of the metal, thereby deteriorating durability. However, in the embodiments, the addition of the benzotriazole group containing compound to the adhesive composition may prevent the corrosion of metal, even under a high-humidity atmosphere. Thus, the adhesive layer formed of the adhesive composition according to the embodiments may have superior durability. In addition, a coating film formed of the adhesive composition may have good transparency, so that an adherend may be less contaminated after being stripped. Therefore, the adhesive composition of the embodiments may be particularly suitable for an adhesive layer of an optical member. Further, the adhesive layer formed of the adhesive composition of the embodiments may have a good network (cross-linking) structure.

Hereafter, the individual components of the adhesive composition according to an embodiment will be described in detail. The term '(meth)acrylate' as used herein may collectively include both acrylate and methacrylate. Likewise, the term "(meth) compound", for example, (meth)acrylic acid, may include both a compound that has the "meth" group and a compound that does not has the "meth" group. Similarly, the term '(meth)acrylic ester' may include both ester acrylic and methacrylic ester.

Polymer (A)

The polymer (A) may be formed by polymerization of (meth)acrylic ester containing monomers.

Examples of the (meth)acrylic ester containing monomer may include methyl(meth)acrylate, ethyl(meth)acrylate, propryl(meth)acrylate, isopropyl(meth)acrylate, n-butyl(meth)acrylate, isobutyl(meth)acrylate, tert-butyl(meth)acrylate, isoamyl(meth)acrylate, n-hexyl(meth)acrylate, n-heptyl(meth)acrylate, n-octyl(meth)acrylate, tert-octyl(meth)acrylate, 2-ethylhexyl(meth)acrylate, decyl(meth)acrylate, isodecyl(meth)acrylate, tridecyl(meth)acrylate, stearyl(meth)acrylate, isostearyl(meth)acrylate, phenyl(meth)acrylate, benzyl(meth)acrylate, dodecyl(meth)acrylate, tetrahydrofurfuryl(meth)acrylate, cyclohexyl(meth)acrylate, 4-n-butylcyclohexyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl(meth)acrylate, 2-(2-butoxyethoxy)ethyl(meth)acrylate, 4-butylphenyl(meth)acrylate, phenyl(meth)acrylate, 2,4,5-tetramethyl phenyl(meth)acrylate, phenoxymethyl(meth)acrylate, phenoxyethyl(meth)acrylate, polyethylene oxide monoalkyl ether(meth)acrylate, polyethylene oxide monoalkyl ether(meth)acrylate, polypropylene oxide monoalkyl ether(meth)acrylate, trifluoroethyl(meth)acrylate, pentadeca fluoro oxyethyl(meth)acrylate, 2-chloroethyl(meth)acrylate, 2,3-dibromopropyl(meth)acrylate, tribromophenyl(meth)acrylate, and the like. Such (meth)acrylic esters may be used alone or in a combination of two or more thereof.

Among the (meth)acrylic esters, methyl(meth)acrylate, ethyl(meth)acrylate, n-butyl(meth)acrylate, isobutyl(meth)acrylate, tert-butyl(meth)acrylate, and 2-ethylhexyl(meth)acrylate are preferable. Methyl acrylate, ethyl acrylate, n-butyl acrylate, and 2-ethylhexyl acrylate are more preferable. Methyl acrylate, n-butyl acrylate, and 2-ethylhexyl acrylate are still more preferable.

In the embodiments, the monomers used in the preparation of the polymer (A) may include, e.g., hydroxyl group containing (meth)acrylic monomers, in addition to the (meth)acrylic esters. Here, the term "hydroxyl group containing (meth)acrylic monomers" may refer to acrylic monomers having a hydroxyl group. Examples of the hydroxyl group containing (meth)acrylic monomers may include 2-hydroxyethyl(meth)acrylate, 4-hydroxybutyl(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxypropyl(meth)acrylate, 2-hydroxybutyl(meth)acrylate, 2-hydroxy-3-phenyloxypropyl(meth)acrylate, 4-hydroxycyclohexyl(meth)acrylate, 2-hydroxyethyl acrylamide, cyclohexanedimethanol monoacrylate, and the like; and a compound obtained by the addition of a glycidyl group containing compound, such as alkyl glycidyl ether, allyl glycidyl ether and glycidyl(meth)acrylate, and (meth)acrylic acid. The hydroxyl group containing (meth)acrylic monomers may be used alone or in a combination of two or more thereof.

Among the hydroxyl group containing (meth)acrylic monomers, 2-hydroxyethyl(meth)acrylate, 4-hydroxybutyl(meth)acrylate, 2-hydroxyethyl acrylamide, and cyclohexanedimethanol monoacrylate are preferable. 2-hydroxyethyl(meth)acrylate, 4-hydroxybutyl(meth)acrylate, and 2-hydroxyethyl acrylamide are more preferable. 2-hydroxyethylacrylate and 4-hydroxybutylacrylate are still more preferable.

In the embodiments, the monomers used in the preparation of the polymer (A) may include monomers (hereinafter, referred to as 'other monomers') copolymerizable with the (meth)acrylic esters and, if present, copolymerizable with the hydroxyl group containing (meth)acrylic monomers in addition to the (meth)acrylic esters. In an implementation, examples of the other monomers may include, but are not limited to, an epoxy group containing acrylic monomer, such as glycidyl(meth)acrylate and methyl glycidyl(meth)acrylate; an amino group containing acrylic monomer, such as dimethylaminoethyl(meth)acrylate, diethylaminoethyl(meth)acrylate, N-tert-butylaminoethyl(meth)acrylate, and methacryloxyethyl trimethylammonium chloride(meth)acrylate; an amide group containing acrylic monomer, such as (meth)acrylamide, n-methylol(meth)acrylamide, N-methoxymethyl(meth)acrylamide, and N,N-methylene bis(meth)acrylamide; a carboxyl group containing acrylic monomer, such as (meth)acrylic acid, 2-methacryloyloxysuccinic acid, 2-methacryloyloxyethyl maleate, 2-methacryloyloxyethyl phthalate, and 2-methacryloyloxyethyl hexahydrophthalate; a phosphate group containing acrylic monomer, such as 2-methacryloyloxyethyl diphenyl phosphate(meth)acrylate, trimethacryloyloxyethyl phosphate(meth)acrylate, and triacryloyloxyethyl phosphate(meth)acrylate; a sulfonic acid group containing acrylic monomer, such as sodium sulfopropyl(meth)acrylate, sodium-2-sulfoethyl(meth)acrylate, and sodium-2-acrylamido-2-methylpropane sulfonate; an urethane group containing acrylic monomer, such as urethane (meth)acrylate; a phenyl group containing acrylic vinyl monomer, such as p-tert-butylphenyl(meth)acrylate and o-biphenyl(meth)acrylate; a silane group containing vinyl monomer, such as 2-acetoacetoxyethyl(meth)acrylate, vinyltrimethoxysilane, vinyltriethoxysilane, vinyl tris(β-methoxyethyl)silane, vinyl triacetylsilane, and methacryloyloxypropyltrimethoxysilane; and styrene, chlorostyrene, α-methylstyrene, vinyltoluene, vinyl chloride, vinyl acetate, vinyl propionate, acrylonitrile, vinyl pyridine, and the like. The other monomers may be used alone or in a combination of two or more thereof.

Among the other monomers, (meth)acrylic acid, (meth)acrylamide, glycidyl(meth)acrylate, dimethylaminoethyl (meth)acrylate, and 2-acetoacetoxyethyl(meth)acrylate are preferable. (Meth)acrylic acid, acrylamide, dimethylaminoethyl(meth)acrylate, and 2-acetoacetoxyethyl(meth)acrylate are more preferable. Acrylic acid is still more preferable.

The polymer (A), as described above, may be prepared by polymerization of the (meth)acrylic ester and, if desired, the hydroxyl group containing (meth)acrylic monomer and/or the other monomers. In the case that the monomer includes two or more kinds of monomers, the polymer (A) may be prepared as a copolymer by copolymerizing the monomers. The composition of the polymer (A) (the amount of each component monomer in the monomers) is not specifically limited.

In the case where the polymer (A) is prepared by copolymerizing the monomers of (meth)acrylic ester and the hydroxyl group containing (meth)acrylic monomer, the amount of (meth)acrylic ester monomer and the hydroxyl group containing (meth)acrylic monomer is not specifically limited. For example, the amount of (meth)acrylic ester is preferably about 95 to about 99.9 parts by weight, and more preferably about 97 to about 99.9 parts by weight, based on 100 parts by weight of the (meth)acrylic ester and the hydroxyl group containing (meth)acrylic monomers. For example, the amount of hydroxyl group containing (meth)acrylic monomer is preferably about 0.1 to about 5 parts by weight, and more preferably about 0.1 to about 3 parts by weight, based on 100 parts by weight of the (meth)acrylic ester and the hydroxyl group containing (meth)acrylic monomers.

Further, in the case where the polymer (A) is prepared by copolymerizing monomers of (meth)acrylic ester, the hydroxyl group containing (meth)acrylic monomer, and the other monomers, the amount of each monomer is not specifically limited. For example, the amount of (meth)acrylic ester is preferably about 80 to about 99.5 parts by weight, more preferably about 88 to about 99.2 parts by weight, and even more preferably about 93 to about 99 parts by weight, based on 100 parts by weight of the (meth)acrylic ester, the hydroxyl group containing (meth)acrylic monomer, and the other monomers. For example, the amount of hydroxyl group containing (meth)acrylic monomer is preferably about 0.5 to about 10 parts by weight, more preferably about 0.6 to about 7 parts by weight, and even more preferably about 0.7 to about 5 parts by weight, based on 100 parts by weight of the (meth) acrylic ester, the hydroxyl group containing (meth)acrylic monomer, and the other monomers. Within this range, the polymer (A) may be properly cross-linked by the cross-linking agent (E), described below. For example, the use of an isocyanate cross-linking agent may not cause excessive cross-linking formed by the reaction of a hydroxyl group derived from a hydroxyl group containing (meth)acrylic monomer in the polymer (A) and the cross-linking agent (E), resulting in the production of an adhesive composition having excellent thermal resistance and flexibility. The amount of other monomers is preferably about 0 to about 10 parts by weight, more preferably about 0.2 to about 5 parts by weight, and even more preferably about 0.3 to about 2 parts by weight, based on 100 parts by weight of the (meth)acrylic ester, hydroxyl group containing (meth)acrylic monomer, and other monomers.

A method of preparing the polymer (A), though not specifically limited, may proceed by any suitable method using a polymerization initiator, e.g., solution polymerization, emulsion polymerization, suspension polymerization, inverse suspension polymerization, thin-film polymerization, and/or spray polymerization. Polymerization control may be achieved by thermal insulation polymerization, temperature control polymerization, and isothermal polymerization. Furthermore, in addition to the method using the polymerization initiator, irradiation, electromagnetic radiation, and ultraviolet radiation may be used to initiate polymerization. For example, the solution polymerization using the polymerization initiator is preferred in that molecular weight may be easily adjusted and fewer impurities may be generated. For example, a solvent of ethyl acetate, toluene, or methyl ethyl ketone, and about 0.01 to about 0.50 parts by weight of the polymerization initiator, based on 100 parts by weight of the monomers, may be added to the monomers and reacted under a nitrogen atmosphere at about 60 to about 90° C. for about 3 to about 10 hours, thereby producing the polymer (A). Examples of the polymerization initiator may include azo compounds, e.g., azobisisobutyronitrile (AIBN), 2-2'-azobis (2-methylbutyronitrile), and azobiscyanovaleric acid; organic peroxides, e.g., tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, e.g., hydrogen peroxide, ammonium persulfate, potassium persulfate, and sodium persulfate. These materials may be used alone or in a combination of two or more thereof.

The polymer (A) prepared by (co)polymerization of the monomers may have a weight average molecular weight (Mw) of preferably about 700,000 to about 2,000,000, and more preferably about 900,000 to about 1,700,000. Maintaining the weight average molecular weight at about 700,000 or greater may help ensure that the polymer (A) has sufficient thermal resistance. Maintaining the weight average molecular weight at about 2,000,000 or less may help ensure that the viscosity of the polymer (A) is not deteriorated. Herein, the term "weight average molecular weight" may refer to a conversion value of polystyrene measured by a method stated in embodiments.

Further, the polymers (A) may be used alone or in a combination of two or more thereof.

Antistatic Agent (B)

The adhesive component of the embodiments may include the antistatic agent (B) in addition to the polymer (A). The addition of the antistatic agent (B) may help prevent attachment of dust in the air to an optical member (caused by static electricity) when applied to the optical member or the like. Thus, an optical member having the adhesive layer formed of the adhesive composition of the embodiments may be less contaminated by an adherend.

The antistatic agent (B) according to the embodiments may include at least one of an ionic compound and a lithium salt. Here, the ionic compound does not include a lithium salt. In an implementation, the ionic compound may be an organic compound.

The ionic compound is not specifically limited. Preferably, the ionic compound is a material compatible with the polymer (A), compatible with an organic solvent used in the preparation of the adhesive composition, and capable of maintaining the transparency of the adhesive composition when added to a base polymer. Moreover, the ionic compound may be a material which allows an adhesive layer to have a surface resistance of about $1×10^{12}$ (Ω/sq) or less when the adhesive composition is applied to a substrate, e.g., an optical sheet, to form the adhesive layer.

Examples of the ionic compound may include, but are not limited to, an imidazolium salt, a pyridinium salt, an alkylammonium salt, an alkylpyrrolidium salt, an alkylphosphonium salt, and a piperidinium salt. The ionic compounds may be used alone or in a combination of two or more thereof.

Examples of the imidazolium salt may include 1-hexyl-3-methylimidazolium hexafluorophosphate, 1,3-dimethylimidazolium chloride, 1-butyl-2,3-dimethylimidazolium chloride, 1-butyl-3-methylimidazolium bromide, 1-butyl-3-methylimidazolium chloride, 1-butyl-3-methylimidazolium methanesulfonate, 1-butyl-1-(3,3,4,4,5,5,6,6,7,7,8,8,8-tridecafluorooctyl)-imidazolium hexafluorophosphate, 1-ethyl-3-methylimidazolium bromide, 1-ethyl-3-methylimidazolium chloride, 1-ethyl-3-methylimidazolium hexafluorophosphate, 1-ethyl-3-methylimidazolim iodide, 1-ethyl-2,3-dimethylimidazolium chloride, 1-methylimidazolium chloride, 1,2,3-trimethylimidazolium methylsulfate, 1-methyl-3-(3,3,4,4,5,5,6,6,7,7,8,8,8-tridecafluorooctyl)-imidazolium hexafluorophosphate, 1-aryl-3-methylimidazolium chloride, 1-benzyl-3-methylimidazolium chloride, 1-benzyl-3-methylimidazolium hexafluorophosphate, 1-benzyl-3-methylimidazolium tetrafluoroborate, and the like.

Examples of the pyridinium salt may include 1-butyl-3-methylpyridinium bromide, 1-butyl-4-methylpyridinium bromide, 1-butyl-4-methylpyridinium chloride, 1-butylpyridinium bromide, 1-butylpyridinium chloride, 1-butylpyridinium hexafluorophosphate, 1-ethylpyridinium bromide, 1-ethylpyridinium chloride, and the like.

Examples of the alkylammonium salt may include cyclohexyltrimethylammonium bis(trifluoromethanesulfonyl) imide, tetra-n-butylammonium chloride, tetrabutylammonium bromide, tributylmethylammonium methylsulfate, tetrabutylammonium bis(trifluoromethylsulfonyl)imide, tetraethylammonium trifluoromethanesulfonate, tetrabutylammonium benzoate, tetrabutylammonium methanesulfate, tetrabutylammonium nonafluorobutanesulfonate, tetra-n-butylammonium hexafluorophosphate, tetrabutylammonium trifluoroacetate, tetrahexylammonium tetrafluoroborate, tetrahexylammonium bromide, tetrahexylammonium iodide, tetraoctylammonium chloride, tetraoctylammonium bromide, tetraheptylammonium bromide, tetrapentylammonium bromide, n-hexadecyltrimethylammonium hexafluorophosphate, and the like.

Examples of the alkylpyrrolidium salt may include 1-butyl-1-methylpyrrolidium bromide, 1-butyl-1-methylpyrrolidium chloride, 1-butyl-1-methylpyrrolidium tetrafluoroborate, and the like.

Examples of the alkylphosphonium salt may include tetrabutylphosphonium bromide, tetrabutylphosphonium chloride, tetrabutylphosphonium tetrafluoroborate, tetrabutylphosphonium methanesulfonate, tetrabutylphosphonium p-toluensulfonate, tributylhexadecylphosphonium bromide, and the like.

Examples of the piperidinium salt may include N-methyl-N-propylpiperidinium bis(trifluoromethanesulfonyl)imide, N-methyl-N-propylpiperidinium bromide, N-methyl-N-proprylpiperidinium hexafluorophosphate, and the like.

In an implementation, the ionic compound may include a nitrogen-containing onium salt, a sulfur containing onium salt, and/or a phosphorus containing salt.

For example, the ionic compound may include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl) imide, 1-butyl-3-methylpyridinium bis(pentafluoroethanesulfonyl)imide, 1-hexylpyridinium tetrafluoroborate, 2-methyl-1-pyrrolin tetrafluoroborate, 1-ethyl-2-phenylindol tetrafluoroborate, 1,2-dimethylindol tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)imide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl) imide, N,N-diethyl-N-methyl-N-(2-methoxyethyl) ammonium bis(pentafluoroethanesulfonyl)imide, glycidyltrimethylammonium trifluoromethanesulfonate, glycidyltrimethylammonium bis(trifluoromethanesulfonyl) imide, glycidyltrimethylammonium bis(pentafluoroethanesulfonyl)imide, 1-butylpyridinium (trifluoromethanesulfonyl)trifluoroacetamide, 1-butyl-3-methylpyridinium(trifluoromethanesulfonyl) trifluoroacetamide, 1-ethyl-3-methylimidazolium (trifluoromethanesulfonyl)trifluoroacetamide, diallyldimethylammonium(trifluoromethanesulfonyl)trifluoroacetamide, glycidyltrimethylammonium(trifluoromethanesulfonyl)trifluoroacetamide, N,N-dimethyl-N-ethyl-N-propylammonium bis(trifluoromethanesulfonyl) imide, N,N-dimethyl-N-ethyl-N-butylammonium bis (trifluoromethanesulfonyl)imide, N,N-dimethyl-N-ethyl-N-pentylammonium bis(trifluoromethanesulfonyl)imide, N,N-dimethyl-N-ethyl-N-hexylammonium bis (trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, and the like.

Examples of the lithium salt, though not specifically limited, may include any suitable material, e.g., lithium bis(trifluoromethanesulfonyl)imide ($Li(CF_3SO_2)_2N$), lithium tris(trifluoromethanesulfonyl)methane ($Li(CF_3SO_2)_3C$), lithium trifluoromethanesulfonate ($LiCF_3SO_3$), and/or lithium perchlorate. In an implementation, the lithium salt may be a lithium salt of an organic compound.

The antistatic agent (B) may be synthesized or may be a commercially available product. Examples of commercially available products may include 1-hexyl-3-methylimidazolium hexafluorophosphate (Tokyo Chemical Industries Co. Ltd.), (N-methyl-N-propylpiperidinium bis(trifluoromethanesulfonyl)imide (Kanto Chemical Co., Inc.), 1-ethylpyridium bromide (Tokyo Chemical Industries Co. Ltd.), 1-butyl-3-methylpyridium trifluoromethanesulfonate (Tokyo Chemical Industries Co. Ltd.), lithium bis(trifluoromethanesulfonyl)imide (Wako Junyaku Co., Ltd.) lithium trifluoromethanesulfonate (Wako Junyaku Co., Ltd.), lithium perchlorate (Wako Junyaku Co., Ltd.), lithium hexafluorophosphate (Morita Kagaku Kogyo Co. Ltd.), and the like.

In an implementation, the amount of antistatic agent (B) may be about 0.01 to about 3.0 parts by weight, with respect to 100 parts by weight of the polymer (A). Within the range, the adhesive composition exhibits superior antistatic properties. The amount is preferably about 0.1 to about 2 parts by weight, and more preferably about 0.5 to about 1.8 parts by weight, with respect to 100 parts by weight of the polymer (A). Maintaining the amount of antistatic agent (B) at about 0.01 parts by weight or greater may help ensure that sufficient antistatic properties are obtained. Maintaining the amount at about 3.0 parts by weight or less may help prevent the occurrence of desquamation or bubbles in a durability test.

Silane Coupling Agent (C)

The adhesive composition of an embodiment may include the silane coupling agent (C) in addition to the polymer (A) and the antistatic agent (B). The use of the silane coupling agent may enhance reactivity and may improve the mechanical strength or adhesive strength of a hardened material.

The silane coupling agent is not specifically limited. Examples of the silane coupling agent may include methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane, cyclohexylmethyldimethoxysilane, vinyltrichlorosilane, vinyltrimethoxysilane, vinyltriethoxysilane, vinyl tris(β-methoxyethoxy) silane, β-(3,4-epoxycyclohexyl)ethyltrimethoxysilane, γ-glycidoxypropyltrimethoxysilane, γ-glycidoxypropyltriethoxysilane, glycidoxypropylmethyldiethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, γ-mercaptopropylmethyldimethoxysilane, bis[3-(triethoxysilyl)propyl]tetrasulfide, γ-isocyanatopropyltriethoxysilane, and the like. In an implementation, a compound with a hydrolytic silyl group may be used. The compound with a hydrolytic silyl group may be obtained by allowing a silane coupling agent (containing functional groups, such as an epoxy group (glycidoxy group), amino group, mercapto group, and/or (meth)acryloyl group) to react with a silane coupling agent containing functional groups reactive to the foregoing functional groups, other coupling agents, and polyisocyanate at a certain rate with respect to the respective functional groups.

The silane coupling agent (C) may be synthesized or may be a commercially available product. Examples of commercially available products may include KBM-303, KBM-403, KBE-402, KBM-403, KBE-502, KBE-503, KBM-5103, KEM-573, KBM-802, KBM-803, KBE-846, KBE-9007 (Shin-etsu Chemical Co., Ltd.), and the like. Among them, KBM-303, KBM-403, KBE-402, KBM-403, KBM-5103, KBM-573, KBM-802, KBM-803, KBE-846, and KBE-9007 are preferable, and KBM-403 is more preferable. The silane coupling agents (C) may be used alone or in a combination of two or more thereof.

In an implementation, the amount of silane coupling agent (C) may be about 0 to about 1 part by weight, with respect to 100 parts by weight of the polymer (A). Within the range, the adhesive composition exhibits adequate antistatic properties. The amount is preferably about 0 to about 0.5 parts by weight, and more preferably about 0 to about 0.1 parts by weight, with respect to 100 parts by weight of the polymer (A). Within the range, the composition exhibits excellent thermal resistance and adhesion. Maintaining the amount of the silane coupling agent (C) at about 1 part by weight or less may help prevent a decrease in thermal resistance.

Benzotriazole Group Containing Compound (D)

The adhesive composition of an embodiment may include the benzotriazole group containing compound (D). The use of the benzotriazole group containing compound (D) may help suppress/prevent the corrosion of metal and may reduce surface resistance to thereby impart antistatic performance.

The antistatic agent (B) of an ionic compound may have a certain degree of corrosion resistance, but is generally expensive. In addition, when the antistatic agent (B) of an ionic compound is excessively added, adhesion may be deteriorated. Thus, when an ionic compound is used as the antistatic agent (B), it may be desirable that the amount of the ionic compound included in the composition is as small as possible. In an implementation, the adhesive composition may contain the benzotriazole group containing compound (D) to reduce surface resistance and to impart antistatic performance. Thus, the amount of the ionic compound included in the composition may be lowered and, despite the reduction in amount of the ionic compound, the surface resistance of the adhesive composition may be decreased to a proper value to thereby accomplish desired antistatic performance. Further, the addition of the bezotriazole group containing compound (D) may facilitate a reduction in the amount of the expensive ionic compound, thereby suppressing adhesion deterioration, achieving excellent adhesion, and realizing cost-efficiency. Therefore, the addition of the bezotriazole group containing compound (D) may enable even a small amount of the ionic compound to exhibit good antistatic properties, corrosion resistance, and adhesion, while reducing the preparation cost of the adhesive composition.

The antistatic agent (B) of a lithium salt is preferred to the ionic compound in view of cost, but may be less desirable in terms of corrosion resistance. Further, when an excessive amount of antistatic agent (B) of a lithium salt is used, adhesion may be deteriorated. Thus, when the lithium salt is used as the antistatic agent, it is desirable that the amount of lithium salt included in the composition is as small as possible. In an implementation, the benzotriazole group containing compound (D) (which may suppress/prevent the corrosion of metal) may be added. Thus, less lithium salt may be added and, in view of the reduction in amount of the lithium salt, the corrosion of metal by the adhesive composition may be significantly avoided. Accordingly, in the case that the adhesive composition of the embodiments is used, the corrosion of metal by the adhesive ingredient may hardly occur, even if it is used for a part that will be brought into contact with metal. Further, the addition of the bezotriazole group containing compound (D) may facilitate the reduction in the amount of the more expensive lithium salt, while still suppressing deterioration in adhesion. Therefore, the addition of the bezotriazole group containing compound (D) may enable even a small amount of a lithium salt to exhibit good antistatic properties and adhesion, while reducing the cost and improving the corrosion resistance of the adhesive composition.

The benzotriazole group containing compound (D) is not specifically limited. Examples of the benzotriazole group containing compound (D) may include compounds represented by the following Formulae I to V:

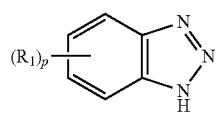
[Formula I]

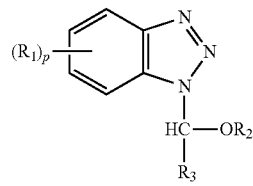
[Formula II]

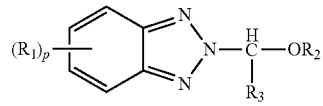
[Formula III]

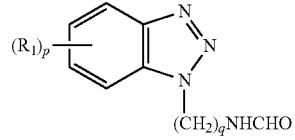
[Formula IV]

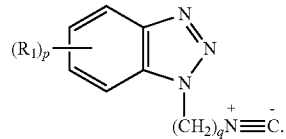
[Formula V]

The compound represented by Formula II has an isomer, and the embodiments include all isomers. The term 'isomer' may include structural isomers, positional isomers, tautomers, cis-trans isomers, and stereoisomers, e.g., mirror isomers and racemic mixtures.

In Formulae I to V, $R_1$ may represent a C1-C4 alkyl or a halogen. In an implementation, examples of the C1-C4 alkyl may include methyl, ethyl, propyl, isopropyl, butyl, isobutyl, sec-butyl, and tert-butyl. Examples of the halogen may include fluorine, chlorine, bromine, and iodine. Among them, $R_1$ is preferably methyl, ethyl, fluorine, and/or chlorine, and more preferably methyl and/or chlorine. If a plurality of $R_1$ groups are present, they may be the same or different. p may be 0 to 4, preferably 0 or 1, and more preferably 0. Furthermore, in Formulae I to V, the expression 'p is 0' may mean that the substituent $R_1$ does not exist, i.e., every substituent of the benzyl group is hydrogen.

$R_2$ may represent a substituent including, e.g., a C1-C12 alkyl, a C5-C7 cycloalkyl, a C5-C7 cycloalkyl substituted by one to three C1-C4 alkyl groups, and/or a C5-C7 cycloalkyl-substituted C1-C4 alkyl. In an implementation, the C1-12 alkyl is not specifically limited, and may include linear or branched alkyl, e.g., methyl, ethyl, propyl, isopropyl, butyl, isobutyl, sec-butyl, tert-butyl, pentyl, hexyl, heptyl, octyl, nonyl, decyl, undecyl, dodecyl, and/or 2-hexyethyl. Examples of the C5-C7 cycloalkyl, though not specifically limited, may include cyclopentyl, cyclohexyl, and cycloheptyl, and preferably cyclopentyl and cyclohexyl. Examples of the C5-C7 cycloalkyl substituted with one to three C1-C4 alkyl groups, though not specifically limited, preferably include cyclopentyl and cyclohexyl substituted with a C1-C4 alkyl, e.g., methyl, ethyl, n-propyl, isopropyl, n-butyl, isobutyl, and/or tert-butyl. Examples of C5-C7 cycloalkyl-substituted C1-C4 alkyl, though not specifically limited, may include cyclopentylmethyl, cyclohexylmethyl, cyclopentyl-1,1-ethyl, cyclohexyl-1,1-ethyl, cyclopentyl-1,2-ethyl, and/or cyclohexyl-1,2,-ethyl. In an implementation, $R_2$ is preferably methyl, ethyl, and/or propyl, and more preferably methyl.

$R_3$ may represent a substituent including, e.g., hydrogen, a C1-C12 alkyl, a C5-C7 cycloalkyl, a C5-C7 cycloalkyl substituted with one to three C1-C4 alkyl groups, a C5-C7 cycloalkyl-substituted C1-C4 alkyl, a phenyl, a phenyl-C1-4 alkyl, a phenyl substituted with one to three C1-C4 alkyl groups, and/or a phenyl-C1-C4 alkyl substituted with one to three C1-C4 alkyl groups. Here, C1-C12 alkyl, C5-C7 cycloalkyl, C5-C7 cycloalkyl substituted with one to three C1-C4 alkyl groups, and C5-C7 cycloalkyl-substituted C1-C4 alky are defined the same as $R_2$. Examples of the phenyl, phenyl-C1-C4 alkyl, phenyl substituted with one to three C1-C4 alkyl groups, and phenyl-C1-C4 alkyl substituted with one to three C1-C4 alkyl groups, though not specifically limited, may include phenyl, benzyl, 1-phenylethyl, 2-phenylethyl, 4-methylcumyl, 4-ethylcumyl, and 4-methylbenzyl. $R_3$ is preferably hydrogen, methyl, ethyl, and/or propyl, and more preferably hydrogen.

q may be 1 to 3, preferably 1 or 2, and more preferably 1.

Examples of the benzotriazole group containing compounds represented by Formulae I to V may include 1,2,3-benzotriazole, 1-(methoxymethyl)-1H-benzotriazole, 1-(formamidomethyl)-1H-benzotriazole, 1-(isocyanomethyl)-1H-benzotriazole, 4-methylbenzotriazole, 5-methylbenzotriazole, 5-chlorobenzotriazole, tolyltriazole, potassium salt of tolyltriazole, 3-(N-salicyloyl)amino-1,2,4-triazole, 2-(2'-hydroxy-5-phenyl methyl)benzotriazole, and the like. These compounds may be used alone or in a combination of two or more thereof. 1,2,3-benzotriazole, 1-(methoxy methyl)-1H-benzotriazole, 1-(formamidomethyl)-1H-benzotriazole, and/or 1-(isocyanomethyl)-1H-benzotriazole are preferred in consideration of convenient use and prevention of corrosion.

1,2,3-benzotriazole

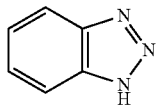

1-(methoxymethyl)-1H-benzotriazole

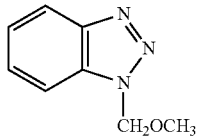

1-(formamidomethyl)-1H-benzotriazole

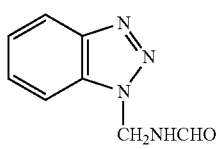

1-(isocyanomethyl)-1H-benzotriazole

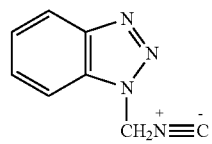

The benzotriazole group containing compound (D) may be synthesized or may be a commercially available product. Examples of commercially available products may include products from Tokyo Chemical Industries Co. Ltd. in Table 1, below.

TABLE 1

| 1,2,3-benzotriazole | 5-methyl-1H-benzotriazole |
|---|---|
| Product Code: B0094 | Product Code: M0249 |
| 5,6-dimethyl-1,2,3-benzotriazole | 5-chlorobenzotriazole |
| Product Code: D2177 | Product Code: C0137 |

In an implementation, the amount of benzotriazole group containing compound (D) included in the composition may be about 3 to about 20 parts by weight, with respect to 100 parts by weight of the polymer (A). Within this range, the adhesive composition exhibits a superior effect in suppressing/preventing the corrosion of metal and superior antistatic performance (ability to lower surface resistance). The amount is preferably about 5 to about 18 parts by weight, and more preferably about 7 to about 15 parts by weight, with respect to 100 parts by weight of the polymer (A). Within this range, the effect of suppressing/preventing the corrosion of metal and the antistatic performance (ability of lowering surface resistance) are further enhanced. Maintaining the amount of benzotriazole group containing compound (D) at about 3 parts by weight or greater may help ensure that the antistatic performance and/or the effect of suppressing/preventing the corrosion of metal are sufficiently obtained. Maintaining the amount at about 20 parts by weight or less may help ensure that the adhesive composition exhibits good adhesion to a substrate (due to low amounts of contamination by an adherend) and exhibits good stability at low temperature.

Cross-Linking Agent (E)

The adhesive composition of an embodiment may include the cross-linking agent (E). The cross-linking agent (E) may react with a functional group of the polymer (A), e.g., a hydroxyl group and, if present, a functional group of the multifunctional (meth)acrylate monomer (F) (described below), e.g., a hydroxyl group, to form cross-linkage. A proper cross-linkage of the cross-linking agent (E) and the polymer (A) and/or the multifunctional (meth)acrylate monomer (F) may lead to the formation of an adhesive layer with excellent thermal resistance. A specific example of a cross-linking method may include a process using a cross-linking agent obtained by reaction of acrylic polymers, e.g., isocyanate compounds, epoxy compounds, aziridine compounds, and metal chelates, and a compound having a functional group reactive with carboxyl, hydroxyl, amino, and amide groups, which may be added for initiating a cross-linking reaction.

Examples of the cross-linking agent (E) may include, but are not limited to, isocyanate compounds, epoxy compounds, aziridine compounds, and metal chelates. Examples of the isocyanate compounds may include aromatic isocyanates, e.g., tolylene diisocyanate and xylene diisocyanate; alicyclic isocyanates, e.g., isophorone diisocyanate; and aliphatic isocyanates, e.g., hexamethylene diisocyanate. Isocyanate compounds and epoxy compounds are particularly preferred in consideration of desirable cohesiveness of the resulting composition. These compounds may be used alone or in a combination of two or more thereof.

In an implementation, the isocyanate compounds may include low aliphatic polyisocyanate, e.g., butylene diisocyanate, hexamethylene diisocyanate, and the like; alicylic isocyanate, e.g., cyclopentylene diisocyanate, cyclohexylene diisocyanate, isophorone diisocyanate, and the like; aromatic diisocyanate, e.g., 2,4-tolylene diisocyanate, 4,4'-diphenylmethane diisocyanate, xylene diisocyanate, and the like; and/or an isocyanate adduct, e.g., trimethylolpropane/tolylene diisocyanate, trimethylolpropane/tolylene diisocyanate trimer adduct, trimethylolpropane/hexamethylene diisocyanate trimer adduct, hexamethylene diisocyanate isocyanurate, and the like.

In an implementation, there may be used: aromatic diisocyanate, e.g., triallyl isocyanurate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylene diisocyanate (XDI), tetramethyl xylene diisocyanate (TMXDI), toluidine diisocyanate, (TODI) and 1,5-naphthalene diisocyanate (NDI); aliphatic diisocyanate, e.g., hexamethylene diisocyanate (HDI), trimethylhexamethylene diisocyanate (TMHDI), lysine diisocyanate, and norbornane diisocyanate (NBDI); alicyclic isocyanate, e.g., trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; or isocyanurate-modified diisocyanates thereof. In addition, adducts of the foregoing isocyanate compounds and polyol compounds, e.g., trimethylolpropane, biurets, and/or isocyanurates of the isocyanate compounds may be used.

The isocyanate compounds may be synthesized or may be commercially available products.

Examples of the commercially available isocyanate cross-linking agents may include Colonate L (trimethylolpropane/tolylene diisocyanate trimer adducts), Colonate HL (trimethylolpropane/hexamethylene diisocyanate trimer adducts), Colonate HX (isocyanurates of hexamethylene diisocyanate), Colonate 2030, Colonate 2031 (Nippon Polyurethane Industry Co., Ltd.), Takenate D-102 (registered trade name), Takenate D-110N (registered trade name), Takenate D-200 (registered trade name), Takenate D-202 (registered trade name, manufactured by Mitsui Chemicals Inc.), Duranate 24A-100 (trade name), Duranate TPA-100 (trade name), Duranate TKA-100 (trade name), Duranate P301-75E (trade name), Duranate E402-90T (trade name), Duranate E405-80T (trade name), Duranate TSE-100 (trade name), and Duranate D-101, Duranate™ D-201(trade name, manufactured by Asahi Kasei Corporation).

Among them, Colonate L, Colonate HL, Takenate D-110N (registered trade name), and Duranate 24A-100 (trade name) are preferable; Colonate L and Takenate D-110N (registered trade name) are more preferable; and Colonate L is still more preferable.

Examples of the epoxy compound may include N,N,N',N'-tetraglycidyl-m-xylenediamine (trade name "TETRAD-X" manufactured by Mitsubishi Gas Chemical Company Inc.), 1,3-bis(N,N-diglycidylaminomethyl)cyclohexane (trade name "TETRAD-C" manufactured by Mitsubishi Gas Chemical Company Inc.), and the like.

The cross-linking agents (E) may be used alone or in a combination of two or more thereof. The amount of cross-linking agent (E) may be adjusted in view of a balance between the polymer (A) to be cross-linked and/or purposes of an optical member.

For example, the amount of cross-linking agent (E) in the composition may be about 0.05 to about 5 parts by weight, with respect to 100 parts by weight of the polymer (A). Within this range, the adhesive composition may form a proper cross-linking structure, thereby exhibiting excellent thermal resistance. The amount is preferably about 0.08 to about 3 parts by weight, more preferably about 0.1 to about 1 part by weight, with respect to 100 parts by weight of the polymer (A). Within this range, the adhesive composition forms a proper cross-linking structure, thereby achieving more superior thermal resistance. Maintaining the amount of cross-linking agent (E) at about 0.05 parts by weight or greater may help ensure that a cross-linked structure is sufficiently formed and that thermal resistance is not decreased. Maintaining the amount at about 5 parts by weight or less may help ensure that a cross-linking reaction does not excessively continue, thereby preventing a decrease in adhesion.

Multifunctional (meth)acrylate Monomer (F)

The adhesive composition of an embodiment may include a multifunctional (meth)acrylate monomer (F). The multifunctional (meth)acrylate monomer (F) may form a network (cross-linking) structure alone or by using the active energy-ray initiator (G).

The multifunctional (meth)acrylate monomer (F) of the embodiments is not specifically limited. Examples of the multifunctional (meth)acrylate monomer (F) may include bifunctional (meth)acrylate monomers, e.g., 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate, allylated cyclohexyl di(meth)acrylate, and triethylene glycol di(meth)acrylate; trifunctional (meth)acrylate monomers, e.g., trimethylolpropane tri(meth)acrylate dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, and tris(acryloxyethyl)isocyanurate; tetrafunctional(meth)acrylate monomers, e.g., diglycerin tetra(meth)acrylate and pentaerythritol tetra(meth)acrylate; pentafunctional (meth)acrylate monomers, e.g., propionic acid-modified dipentaerythritol penta(meth)acrylate; and hexafunctional (meth)acrylate monomers, e.g., dipentaerythritol hexa(meth)acrylate and caprolactone-modified dipentaerythritol hexa(meth)acrylate.

The multifunctional (meth)acrylate monomers (F) may be used alone or in combination of two or more thereof. In an implementation, among the multifunctional (meth)acrylate monomers (F), an acrylate monomer with a ring structure is preferably used. In an implementation, the ring structure may be a carbocyclic, heterocyclic, monocyclic, or multicyclic structure. Examples of the multifunctional (meth)acrylate monomer (F) may include isocyanurates, e.g., di(acryloxyethyl)isocyanurate and tris(acryloxyethyl)isocyanurate, dimethyloldicyclopentane diacrylate, ethylene oxide modified hexahydrophthalic acid diacrylate, tricyclodecanedimethanol acrylate, neopentylglycol modified trimethylolpropane diacrylate, and adamantane diacrylate.

In an implementation, the multifunctional (meth)acrylate monomer (F) may include active energy-ray curable acrylate oligomers. An average molecular weight of the acrylate oligomer is preferably about 50,000 or less. Examples of acrylate oligomers may include polyester acrylates, epoxy acrylates, urethane acrylates, polyether acrylates, polybutadiene acrylates, and silicon acrylates.

In an implementation, the polyester acrylate oligomer may be obtained by esterification of a hydroxyl group of a polyester oligomer having hydroxyl groups at terminal ends thereof, as prepared by condensation of multivalent carboxylic acid and multivalent alcohol, with (meth)acrylic acid, or by esterification of a terminal hydroxyl group of an oligomer, as prepared by addition of multivalent carboxylic acid and alkylene oxide, with (meth)acrylic acid. The epoxy acrylate oligomer may be obtained by esterification of an oxirane ring of a bisphenol type epoxy resin or a novolac type epoxy resin having a low molecular weight as compared with the (meth) acrylic acid. Further, an epoxy acrylate oligomer of a carboxylic acid modified type obtained by partially modifying the epoxy acrylate oligomer with dibasic carboxylic anhydride may be used as well. The urethane acrylate oligomer may be prepared by esterification of a polyurethane oligomer (as obtained via reaction of a polyether polyol or polyester polyol and polyisocyanate) with (meth)acrylic acid. The polyol acrylate oligomer may be obtained by esterification of a hydroxyl group of a polyether polyol with (meth)acrylic acid.

As noted above, the acrylate oligomers may have a weight average molecular weight (e.g., a value based on a polymethyl(meth)acrylate standard measured by gel permeation chromatography (GPC)) of preferably about 50,000 or less, more preferably about 500 to about 50,000, and even more preferably about 3,000 to about 40,000. The acrylate oligomers may be used alone or in a combination of two or more thereof.

In an implementation, an example of the multifunctional (meth)acrylate monomer (F) may also include adducts of acrylate polymers with a (meth)acryloyl group introduced to a side chain. The adducts of acrylate polymers may be obtained from a copolymer of a (meth)acrylic ester (explained in the description of the polymer (A)) and a monomer having a cross-linking functional group, by reacting part of the cross-linking functional group of the copolymer with a compound having a functional group reactive with the (meth) acryloyl group and the cross-linking groups. The adduct of acrylate polymers may have a weight average molecular weight of about 500,000 to about 2,000,000, based on a polystyrene standard.

In an implementation, the multifunctional (meth)acrylate monomer (F) may include one or two or more of the the multifunctional acrylate monomers, acrylate oligomers, and adducts of acrylate polymers.

In an implementation, an amount of multifunctional (meth) acrylate monomer (F) included in the composition may be about 3 to about 30 parts by weight, with respect to 100 parts by weight of the polymer (A). Within this range, the adhesive composition forms a proper network (cross-linking) structure. The amount is preferably about 5 to about 25 parts by weight and more preferably about 5 to about 20 parts by weight, with respect to 100 parts by weight of the polymer (A). Within this range, the adhesive composition forms a more proper network (cross-linking) structure. Maintaining the amount of the multifunctional (meth)acrylate monomer (F) at about 3 parts by weight or greater may help ensure that an adhesive layer has a sufficient network (cross-linking) structure. Maintaining the amount at about 30 parts by weight or less may help prevent a decrease in cohesiveness.

Active Energy-Ray Initiator (G)

The adhesive composition of an embodiment may include an active energy-ray initiator (G). The presence of the active energy-ray initiator (G) may facilitate the proper formation of a network (cross-linking) structure by the multifunctional (meth)acrylate monomer (F).

Examples of the active energy-ray initiator (G) may include, but are not limited to, benzoin, benzoin methyl ether, benzoin ethyl ether, benzoin isopropyl ether, benzoin-n-butylether, benzoin isobutylether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexyl phenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenyl benzophenone, 4,4'-diethyl aminobenzophenone, dichlorobenzophenone, 2-methyl anthraquinone, 2-ethyl anthraquinone, 2-tert-butyl anthraquinone, 2-amino anthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone, and diphenyl(2,4,6-trimethylbenzoyl-diphenyl-phosphine)oxide. These materials may be used alone or in a combination of two or more thereof.

In an implementation, the amount of active energy-ray initiator (G) included in the composition may be 0 to about 5 parts by weight, with respect to 100 parts by weight of the polymer (A). Within this range, the adhesive composition forms a proper network (cross-linking) structure. The amount is preferably about 0.5 to about 4 parts by weight, and more preferably about 1 to about 3 parts by weight, with respect to 100 parts by weight of the polymer (A). Within this range, the adhesive composition forms a more proper network (cross-linking) structure. Maintaining the amount of the active energy-ray initiator (G) at about 5 parts by weight of less may help prevent a decrease in cohesiveness.

The adhesive composition of an embodiment may include the cross-linking agent (E) or at least one of the multifunctional (meth)acrylate monomer (F) and the active energy-ray initiator (G). The cross-linking agent (E) or at least one of the multifunctional (meth)acrylate monomer (F) and the active energy-ray initiator (G) may be involved in a cross-linking reaction to form a cross-linking (network) structure in the polymer (A), if present, between the multifunctional (meth) acrylate monomers (F), or between the polymer (A) and the multifunctional (meth)acrylate monomer (F). In an implementation, the cross-linking reaction may be carried out by a method using, though not specifically limited to, the cross-linking agent (E) or at least one of the multifunctional (meth) acrylate monomer (F) and the active energy-ray initiator (G) or by a proper method depending on the kind of the cross-linking agent (E), the multifunctional (meth)acrylate monomer (F), and the active energy-ray initiator (G). Specific examples may include cross-linking by heat, by ultraviolet irradiation, by electron beam irradiation, and the like. Hereinafter, examples of a cross-linking reaction will be explained, but the embodiments are not limited by the following examples.

For example, when the cross-linking agent (E) is used, cross-linking by heat, by ultraviolet irradiation, and/or by electron beam irradiation may be used. Here, the expression 'when the cross-linking agent (E) is used' may mean the use of at least a cross-linking agent (E), i.e., the use of only the cross-linking agent (E), the use of the cross-linking agent (E) and the multifunctional (meth)acrylate monomer (F), and the use of the cross-linking agent (E), the multifunctional (meth)acrylate monomer (F) and the active energy-ray initiator (G).

In the case that the multifunctional (meth)acrylate monomer (F) and the active energy-ray initiator (G) are used without the cross-linking agent (E), cross-linking by ultraviolet irradiation and by electron beam irradiation may be used.

Further, in the case that the multifunctional (meth)acrylate monomer (F) is used and the active energy-ray initiator (G) is not used (i.e., the active energy-ray initiator (G) is in an amount of 0 parts by weight), cross-linking by electron beam irradiation may be used. For example, the active energy-ray initiator (G) may not be added, and the cross-liking agent (E) may be included. Alternatively, the cross-liking agent (E) may also be omitted.

In the embodiments, the cross-linking conditions may not be particularly limited, an may include suitable methods. For example, in a cross-linking process carried out by heat, though not specifically limited, the polymer (A) may be mixed in certain amounts with the antistatic agent (B), the silane coupling agent (C), the benzotriazole group containing compound (D), the cross-linking agent (E), the multifunctional (meth)acrylate monomer (F), and the active energy-ray initiator (G) to prepare an adhesive composition. The adhesive composition may then be applied to a release film, followed by a cross-linking reaction by heat. In an implementation, the cross-linking reaction preferably includes heat cross-linking of a coating on the release film at about 80 to about 110° C. for about 1 to about 5 minutes and then aging the same at about 20 to about 45° C. and a humidity of about 10 to about 65% RH for 0 to about 10 days. More preferably, the coating on the release film is subjected to the heat cross-linking at about 90 to about 100° C. for about 1 to about 3 minutes and then aged at about 20 to about 35° C. and a humidity of about 20 to about 60% RH for 0 to about 7 days. In the heat cross-linking, amounts of the cross-linking agent (E), the multifunctional (meth)acrylate monomer (F), and the active energy-ray initiator (G) are not particularly limited. Preferably, the cross-linking agent (E) is added in an amount of about 0.05 to about 5 parts by weight, with respect to 100 parts by weight of the polymer (A); and the multifunctional (meth)acrylate monomer (F) and the active energy-ray initiator (G) may not be added.

In a cross-linking process carried out by ultraviolet irradiation, though not specifically limited, the polymer (A) may be mixed in certain amounts with the antistatic agent (B), silane coupling agent (C), benzotriazole group containing compound (D), cross-linking agent (E), multifunctional (meth)acrylate monomer (F), and active energy-ray initiator (G) to prepare an adhesive composition. The adhesive composition may then be applied to a release film, followed by the cross-linking reaction by ultraviolet irradiation. In an implementation, the cross-linking reaction may be carried out by irradiating ultraviolet light with a wavelength of preferably about 400 nm or less, and more preferably about 200 to about 380 nm, to a coating on the release film at an irradiation intensity of about 100 to about 500 mW/cm$^2$ in an irradiation dose of about 100 to about 1000 mJ/cm$^2$. More preferably, ultraviolet light with a wavelength of preferably about 400 nm or less, particularly preferably about 200 to about 380 nm, may be irradiated to the coating on the release film at an irradiation intensity of about 100 to about 400 mW/cm$^2$ in an irradiation dose of about 200 to about 800 mJ/cm$^2$. An ultraviolet source may be, e.g., a high pressure mercury lamp, low pressure mercury lamp, metal halide lamp, xenon lamp, halogen lamp, and the like. In the irradiation of ultraviolet light, preferably ultraviolet light of about 380 nm or less, radioactive rays or rays with different wavelength may be included and a method thereof is not particularly limited. In the cross-linking carried out by ultraviolet irradiation, amounts of the cross-linking agent (E), the multifunctional (meth)acrylate monomer (F), and the active energy-ray initiator (G) are not particularly limited. Preferably, with respect to 100 parts by weight of the polymer (A), the cross-linking agent (E) may be added in an amount of 0 to about 5 parts by weight, the multifunctional (meth)acrylate monomer (F) may be added in an amount of about 3 to about 30 parts by weight, and the active energy-ray initiator (G) may be added in an amount of about 0.1 to about 5 parts by weight.

Although it is not clearly known why a cross-linked structure is foamed through ultraviolet irradiation, a cross-linked structure may be formed despite the absence of the cross-linking agent (E). Thus, without being bound by theory, it is assumed that the active energy-ray initiator (G) (which is activated by ultraviolet irradiation) may act on the polymer (A) or the multifunctional (meth)acrylate monomer (F) to combine the two through a certain mechanism. Presumably, for example, carbon atoms may be activated by hydrogen extracted from the polymer (A) or the multifunctional (meth) acrylate monomer (F) so that neighboring carbon atoms combine with each other, thereby resulting in random formation of a cross-linked structure.

In a cross-linking process by electron beam irradiation, though not specifically limited, the polymer (A) may be mixed in certain amounts with the antistatic agent (B), silane coupling agent (C), benzotriazole group containing compound (D), cross-linking agent (E), multifunctional (meth) acrylate monomer (F), and active energy-ray initiator (G) to prepare an adhesive composition. The adhesive composition may be applied to a release film, followed by the cross-linking reaction by electron beam irradiation. In an implementation, the cross-linking reaction may be carried out by irradiating electron beams to the coating on the release film at an accelerating voltage of about 100 to about 250 kV and an absorbed dose of about 10 to about 60 kGy under an inert gas atmosphere. More preferably, electron beams are irradiated to the coating on the release film at an accelerating voltage of about 100 to about 200 kV and an absorbed dose of about 20 to about 40 kGy under an inert gas atmosphere. Examples of the inert gas may include, but are not particularly limited to, helium, argon, nitrogen, and the like. Further, oxygen may be included in the inert gas atmosphere and, in this case, the concentration thereof is preferably about 200 ppm by volume or less. In the cross-linking by electron beam irradiation, the amounts of cross-linking agent (E), multifunctional (meth) acrylate monomer (F), and active energy-ray initiator (G) are not particularly limited. Preferably, with respect to 100 parts by weight of the polymer (A), the cross-linking agent (E) may be added in an amount of 0 to about 5 parts by weight, the multifunctional (meth)acrylate monomer (F) may be added in an amount of about 3 to about 30 parts by weight, and the active energy-ray initiator (G) may be added in an amount of 0 to about 5 parts by weight.

Although it is not clearly known why a cross-linked structure is formed by electron beam irradiation, a cross-linked structure is formed despite the absence of the active energy-ray initiator (G). Thus, without being bound by theory, it is assumed that electron beam irradiation causes formation of an active area in the polymer (A) or the multifunctional (meth)acrylate monomer (F) to combine the two through a certain mechanism. Presumably, for example, carbon atoms may be activated by hydrogen extracted from the polymer (A) or the multifunctional (meth)acrylate monomer (F), so that adjacent carbon atoms combine with each other, resulting in random formation of the cross-linked structure.

The adhesive composition of an embodiment may include an additive, e.g., a hardener, an ionic liquid, an inorganic filler, a softener, an antioxidant, an anti-aging agent, a stabilizer, a tackifier resin, a reforming resin (polyol resin, phenoly resin, acrylic resin, polyester resin, polyolefin resin, epoxy resin, epoxylated polybutadiene resin, etc.), a leveling agent, an antifoaming agent, a plasticizer, a dye, a pigment (coloring and extender pigments), a treating agent, a UV blocking agent, a fluorescent whitening agent, a dispersing agent, a thermal stabilizer, a light stabilizer, a UV absorber, a lubricant, and/or a solvent. Examples of the hardener may include dibutyltin dilaurate, JCS-50 (Johoku Chemical Company Ltd.) and Formate TK-1 (Mitsui Chemicals Inc.). Examples of the antioxidant may include dibutylhydroxytoluene (BHT), Irganox 1010 (registered trade name), Irganox 1035FF (registered trade name), Irganox 565(registered trade name, all manufactured by Chiba Specialty Chemicals Co., Ltd.), and the like. Examples of the tackifier may include rosins, e.g. rosin acid, a rosin polymer, and rosin ester, a terpene resin, a terpene phenolic resin, an aromatic hydrocarbon resin, an aliphatic saturated hydrocarbon resin, a petroleum resin, and the like. When the additives are used, although not particularly limited, the amount may be, e.g., about 0.1 to about 20 parts by weight, based 100 parts by weight of (A) to (G).

The adhesive composition of an embodiment may be prepared by mixing the ingredients into a uniform mixture, e.g., mixing all of the ingredients at the same time, mixing them sequentially, or mixing some of them first and then mixing the others next. For example, as desired, the ingredients may be heated to about 30 to about 40° C. and mixed in a mixer until they are uniformly mixed, e.g., for about 10 minutes to about 5 hours.

The adhesive composition of an embodiment may be used to bond materials. In an implementation, the adhesive composition may be applied to materials, e.g., glass, a plastic film, paper, metal foil, and the like. The glass may include, e.g., typical inorganic glass. Plastic of the plastic film may include, e.g., a polyvinyl chloride resin, polyvinylidene chloride, a cellulose resin, an acrylic resin, cycloolefin resins, amorphous polyolefin resins, polyethylene, polypropylene, polystyrene, an ABS resin, polyamide, polyester, polycarbonate, polyurethane, polyvinyl alcohol, an ethylene-vinyl acetate copolymer, and/or chlorinated polypropylene. The amorphous polyolefin resins may generally include a polymer with a cyclic polyolefin, e.g., norbornene or multiple-ring norbornene monomers, and may be a copolymer of cyclic olefin and a liner-cyclic olefin. Products of amorphous polyolefin resins on the market may include ATON (trade name, JSR Co.), ZEONEX and ZEONR (registered trade name, Nihon Zeon Co.), APO (Mitsui Chemicals Inc.), APEL (trade name), and the like. The amorphous polyolefin resins may be formed into a film by suitable methods, e.g., solvent casting and melt extrusion. Examples of the paper may include vellum paper, wood free paper, kraft paper, art coat paper, caster coat paper, bowl paper, artificial parchment, waterproof paper, glassine paper, and linerboard. Examples of the metal foil may include aluminum foil.

The embodiments also provide an optical member with an adhesive layer formed of the adhesive composition described above. FIG. 3 illustrates a schematic cross-sectional view of an optical member according to an embodiment. The optical member may include an optical film 20 and an adhesive layer 10 formed of the adhesive composition on at least one surface of the optical film 20.

Examples of the optical member may include a polarizing plate, a retardation plate, an optical film for a plasma display, a conductive film for a touch panel, and the like. Among these, the adhesive composition of an embodiment may be superior in adhesion to a polarizing plate and glass. However, the embodiments are not limited thereto, and may be applied to adhesion to other members.

The adhesive composition of an embodiment may be applied directly to one or both sides of an optical film to form an adhesive layer or may form an adhesive layer in advance on a release film to be transferred to one of both sides of an optical film.

The adhesive composition of an embodiment may be applied by suitable methods, e.g., natural coater, knife belt coater, floating knife, knife over roll, knife on blanket, spraying, dipping, kiss-roll, squeeze roll, reverse roll, air blade, curtain flow coater, doctor blade, wire bar, die coater, comma coater, baker applicator, and gravure coater. The adhesive composition may have a coating thickness (a thickness after drying), selectable depending on materials and purposes, of preferably about 5 to about 40 µm, and more preferably about 15 to about 30 µm.

The adhesive composition is not particularly limited in terms of viscosity. In consideration of application facilitation, however, the adhesive composition may have a viscosity of preferably about 500 to about 5,000 mPas at 25° C., and more preferably about 1,000 to about 3,000 mPas. Maintaining the viscosity at about 500 mPas or greater may help ensure that an even applied surface. Maintaining the viscosity at about 5,000 mPas or less may help prevent the occurrence of a stripe pattern during the application.

An adhesive layer obtained from the adhesive composition of an embodiment may be prepared by cross-linking the adhesive composition. The cross-linking may generally be carried out after applying the adhesive composition, but an adhesive layer of the cross-linked adhesive composition may be transferred to a substrate. The cross-linking may be achieved by generally leaving the adhesive composition by the foregoing method or under the foregoing conditions.

The adhesive composition of an embodiment may have superior antistatic performance (low surface resistance) and may also exhibit excellent corrosion resistance (rust resisting properties). Thus, the adhesive composition of an embodiment may be effective in adhesion to an adherend, e.g., a variety of plastic films. For example, a polarizing film formed using the adhesive compositions may achieve excellent light leakage resistance, antistatic properties, and corrosion resistance (rusting resisting properties). Further, the adhesive composition of an embodiment may exhibit superior flexibility resulting in excellent reworkability (re-release property) or processability. For example, in an adhesion process of an optical member, if an optical film and an adherend are dislocated, the optical film may be released without the adhesive composition remaining on the adherend. In an implementation, a polarizing film formed using the adhesive composition may exhibit superior light leakage resistance and reworkability.

In addition, the adhesive composition of an embodiment may exhibit excellent thermal resistance to result in high durability which means a release or separation phenomenon may not occur due to thermal treatment or high-humidity treatment

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

The solid content and viscosity of a solution in which an adhesive composition was dissolved was measured; and the weight average molecular weight of a polymer (A) was measured by the following process.

<Solid Content>

About 1 g of a polymer solution was precisely weighed on a glass plate, dried at 105° C. for 1 hour, and cooled to a room temperature. Giving the mass of the glass plate as X, the total mass of the glass plate before drying and the polymer solution Y, and the total mass of the glass plate and a remaining solid content Z, a solid content was calculated by the following equation 1.

$$\text{Solid content (\%)} = (Z-X)/(Y-X) \times 100 \quad \text{Equation 1}$$

<Viscosity>

The adhesive solution in a glass bottle was adjusted to 25° C. and measured by a B-type viscometer.

<Weight Average Molecular Weight and Number Average Molecular Weight>

The weight average molecular weight and the number average molecular weight were measured by the following method under the following condition given in Table 2.

TABLE 2

| Equipment: | Gel Permeation Chromatography (GPC, Device No. GPC-16) |
|---|---|
| Detector: | Differential refractive index detector (Tosoh Corporation, RI-8020, Sensitivity 32) |
| | UV Absorbance Detector (Waters, 2487, Wavelength 215 nm, Sensitivity 0.2AUFS) |
| Column: | Tosoh Corporation, TSKgel GMHXL (two), G2500HXL (one) (S/N M0052, M0051, N0010, f7.8 mm × 30 cm) |
| Solvent: | Tetrahydrofuran (Wako Junyaku Co., Ltd.) |
| Flow rate: | 1.0 ml/min |
| Column temperature: | 23° C. |
| Sample: | [Concentration] about 0.2% |
| | [Dissolving] smoothly mixed at room temperature |
| | [Solubility] dissolved (identified with naked eye) |
| | [Filtration] filtrated by a 0.45 μm filter |
| | Input: 0.200 ml |
| | Reference sample: mono-dispersed polystyrene |
| Data processing: | GPC data processing system |

Synthesis Example 1

99 parts by weight of n-butyl acrylate (Nihon Shokubai, Co., Ltd.), 1 part by weight of 2-hydroxyethyl acrylate (Nihon Shokubai, Co., Ltd.), and 120 parts by weight of ethyl acetate were placed in a flask (equipped with a reflux condenser and an agitator), and were heated to 65° C. under a nitrogen atmosphere. Then, 0.04 parts by weight of azobisisobutyronitrile (AIBN) was added, and the polymerization was allowed to proceed for 6 hours while maintaining a temperature of 65° C. After completing the polymerization, the polymerization solution was cooled to room temperature, and was diluted with 280 parts by weight of ethyl acetate, thereby preparing a solution of a polymer (A-1). The solution of the polymer (A-1) had a solid content of 20% by weight and a viscosity of 4,500 mPas. Further, the polymer (A-1) solution had a weight average molecular weight of 1,600,000.

Synthesis Examples 2 to 19

Solutions of polymers (A-2) to (A-19) were prepared by substantially the same process as Example 1 except for monomers, as shown in Table 3 of FIG. 1. Then, the solutions of the polymers (A-2) to (A-19) were measured in terms of solid content, viscosity, and weight average molecular weight, and the results are shown in Table 3. In Table 3, the abbreviations 'BA,' '2EHA,' 'HEA,' '4HBA,' and 'AA' stand for butyl acrylate, 2-ethylhexyl acrylate, 2-hydroxyethyl acrylate, 4-hydroxybutyl acrylate, and acrylic acid, respectively.

Example 1

As shown in Table 4 of FIG. 2, with respect to 100 parts by weight of the polymer (A-1), 0.01 parts by weight of 1-hexyl-3-methylimidazolium hexafluorophosphate (Tokyo Chemical Industries Co., Ltd.) as an antistatic agent (B), 0.1 parts by weight of 3-glycidoxypropylmethyldiethoxysilane (KBM-403, Shin-etsu Chemical Co., Ltd.) as a silane coupling agent (C), 5 parts by weight of 1,2,3-benzotriazole (B0094, Tokyo Chemical Industries Co. Ltd.) as a benzotriazole group containing compound (D), 0.1 parts by weight of trimethylolpropane/tolylene diisocyanate (CORONATE L, Nippon Polyurethane Industries Co., Ltd.) as a cross-linking agent (E), 5 parts by weight of trimethylolpropane triacrylate (LIGHT ACRYLATE TMP-A, Kyoeisha Chemical Co., Ltd.) as a multifunctional (meth)acrylate monomer (F), and diphenyl (2,4,6-trimethylbenzoyl)phosphine oxide (DAROCUR TPO, Chiba Specialty Chemicals Co., Ltd.) as an active energy-ray initiator (G) were thoroughly mixed into an adhesive composition 1.

The adhesive composition 1 was applied to a PET release film (MRF35, Thickness: 38 μm, Mitsubishi Polyester film Inc.) by a baker applicator to have a dry thickness of 25 μm, and placed on a polarizing plate. After 30 minutes, the PET release film was exposed to ultraviolet light (UV) under the following conditions, thereby producing a polarizing plate 1 with an adhesive layer.

<UV Irradiation Conditions>

UV luminance meter: UVPF-A1 (PD-365), Eye Graphics Co., Ltd.

UV irradiator: Metal halide lamp, Eye Graphics Co., Ltd.

Irradiation intensity: 200 mW/cm$^2$

Irradiation amount: 400 mJ/cm$^2$

Examples 2 and 3

As shown in Table 4, the polymer (A), the antistatic agent (B), the silane coupling agent (C), the benzotriazole group containing compound (D), the cross-linking agent (E), the multifunctional (meth)acrylate monomer (F), and the active energy-ray initiator (G) were thoroughly mixed into adhesive compositions 2 and 3.

The adhesive compositions 2 and 3 were treated by the same process as in Example 1, thereby producing a polarizing plate 2 with an adhesive layer and a polarizing plate 3 with an adhesive layer.

Example 4

As shown in Table 4, with respect to 100 parts by weight of the polymer (A-4), 1 part by weight of 1-hexyl-3-methylimidazolium hexafluorophosphate (Tokyo Chemical Industries Co., Ltd.) and 1 part by weight of 1-butyl-3-methylpyridinium trifluoromethanesulfonate (Tokyo Chemical Industries Co., Ltd.) as an antistatic agent (B), 0.1 parts by weight of 3-glycidoxypropylmethyldiethoxysilane (KBM-403, Shin-etsu Chemical Co., Ltd.) as a silane coupling agent (C), 20 parts by weight of 1,2,3-benzotriazole (B0094, Tokyo Chemical Industries Co. Ltd.) as a benzotriazole group containing compound (D), and 20 parts by weight of triethylene glycol diacrylate (LIGHT ACRYLATE 3EG-A, Kyoeisha Chemical Co., Ltd.) as a multifunctional (meth)acrylate monomer (F) were thoroughly mixed into an adhesive composition 4.

The adhesive composition 4 was applied to a PET release film (MRF35, Thickness: 38 μm, Mitsubishi Polyester film Inc.) by a baker applicator to have a dry thickness of 25 μm, and placed on a polarizing plate. After 30 minutes, the PET release film was exposed to electron beams (EB) under the following conditions and a nitrogen atmosphere (oxygen concentration: 200 ppm or less by volume), thereby producing a polarizing plate 4 with an adhesive layer.

<EB Irradiation Conditions>
EB luminance meter: Electron beam irradiation device, Eye Electron Beam Co., Ltd.
Accelerating voltage: 150 kV
Absorbed dose: 30 kGy Examples 5 and 6

As shown in Table 4, the polymer (A), the antistatic agent (B), the silane coupling agent (C), the benzotriazole group containing compound (D), the cross-linking agent (E), the multifunctional (meth)acrylate monomer (F), and the active energy-ray initiator (G) were thoroughly mixed into adhesive compositions 5 and 6.

The adhesive compositions 5 and 6 were treated by the same process as in Example 1, thereby producing a polarizing plate 5 with an adhesive layer and a polarizing plate 6 with an adhesive layer.

Example 7

As shown in Table 4, with respect to 100 parts by weight of the polymer (A-7), 2 parts by weight of lithium perchlorate (Wako Junyaku Co., Ltd.) as an antistatic agent (B), 0.1 parts by weight of 3-glycidoxypropylmethyldiethoxysilane (KBM-403, Shin-etsu Chemical Co., Ltd.) as a silane coupling agent (C), 10 parts by weight of 1-(methoxy methyl)-1H-benzotriazole (M1276, Tokyo Chemical Industries Co. Ltd.) as a benzotriazole group containing compound (D), and 0.5 parts by weight of N,N,N',N'-tetraglycidyl-m-xylenediamine (TETRAD-X, Mitsubishi Gas Chemical Company, Ltd.) as a cross-linking agent (E) were thoroughly mixed into an adhesive composition 7.

The adhesive composition 7 was applied to a PET release film (MRF35, Thickness: 38 μm, Mitsubishi Polyester film Inc.) by a baker applicator to have a dry thickness of 25 μm, followed by a thermal cross-linking reaction at 90° C., to prepare an adhesive precursor, and the adhesive precursor was placed on a polarizing plate. Then, the product was subjected to aging (maturing) at 23° C./50% RH for 7 days, thereby producing a polarizing plate 7 with an adhesive layer.

Example 8

As shown in Table 4, the polymer (A), the antistatic agent (B), the silane coupling agent (C), the benzotriazole group containing compound (D) and the cross-linking agent (E) were thoroughly mixed into an adhesive composition 8.

The adhesive composition 8 was treated by the same process in Example 7, thereby producing a polarizing plate 8 with an adhesive layer.

Example 9

As shown in Table 4, the polymer (A), the antistatic agent (B), the silane coupling agent (C), the benzotriazole group containing compound (D), the cross-linking agent (E) and the multifunctional (meth)acrylate monomer (F) were thoroughly mixed into an adhesive composition 9.

The adhesive composition 9 was treated by the same process as in Example 4, thereby producing a polarizing plate 9 with an adhesive layer.

Example 10

As shown in Table 4, the polymer (A), the antistatic agent (B), the silane coupling agent (C), the benzotriazole group containing compound (D), the cross-linking agent (E), the multifunctional (meth)acrylate monomer (F), and the active energy-ray initiator (G) were thoroughly mixed into an adhesive composition 10.

The adhesive composition 10 was treated by the same process in Example 1, thereby producing a polarizing plate 10 with an adhesive layer.

Comparative Example 1

As shown in Table 4, the polymer (A), the antistatic agent (B), the silane coupling agent (C), the benzotriazole group containing compound (D), the cross-linking agent (E), the multifunctional (meth)acrylate monomer (F), and the active energy-ray initiator (G) were thoroughly mixed into comparative adhesive compositions 1 to 5.

The comparative adhesive compositions 1 to 5 were treated by the same process as in Example 1, thereby producing comparative polarizing plates 1 to 5 with an adhesive layer.

Comparative Example 6

As shown in Table 4, the polymer (A), the antistatic agent (B), the silane coupling agent (C), the benzotriazole group containing compound (D) and the cross-linking agent (E) were thoroughly mixed into a comparative adhesive composition 6.

The comparative adhesive composition 6 was treated by the same process as in Example 7, thereby producing a comparative polarizing plate 6 with an adhesive layer.

Comparative Example 7

As shown in Table 4, the polymer (A), the antistatic agent (B), the silane coupling agent (C), the benzotriazole group containing compound (D), and the multifunctional (meth)

acrylate monomer (F) were thoroughly mixed into a comparative adhesive composition (7).

The comparative adhesive composition 7 was treated by the same process as in Example 4, thereby producing a comparative polarizing plate 7 with an adhesive layer.

Comparative Example 8

As shown in Table 4, the polymer (A), the antistatic agent (B), the silane coupling agent (C), the benzotriazole group containing compound (D), and the cross-linking agent (E), were thoroughly mixed into a comparative adhesive composition 8.

The comparative adhesive composition 8 was treated by the same process as in Example 7, thereby producing a comparative polarizing plate 8 with an adhesive layer.

Comparative Example 9

As shown in Table 4, the polymer (A), the antistatic agent (B), the silane coupling agent (C), the benzotriazole group containing compound (D), and the cross-linking agent (E), were thoroughly mixed into a comparative adhesive composition 9.

The comparative adhesive composition 9 was treated by the same process as in Example 7, thereby producing a comparative polarizing plate 9 with an adhesive layer.

The polarizing plates 1 to 10 with an adhesive layer obtained in Examples 1 to 10 and the comparative polarizing plates 1 to 9 with an adhesive layer in Comparative Examples 1 to 9 were evaluated in terms of surface resistance, corrosion resistance, light leakage resistance, durability, adhesion, adhesion to a substrate, adherend contamination properties, low-temperature stability, reworkability, and gel content by the following method. The results are shown in Table 4.

In Table 4, the letters 'A,' 'B,' 'C,' 'D,' 'E,' and 'F' stand for the polymer (A), the antistatic agent (B), the silane coupling agent (C), the benzotriazole group containing compound (D), the cross-linking agent (E), the multifunctional (meth)acrylate monomer (F), and the active energy-ray initiator (G), respectively. Each component in Table 4 is specified as follows and indicated by 'parts by weight.'

[Polymer (A)]

Polymers (A-1) to (A-19), used in Examples 1 to 10 and in Comparative Examples 1 to 9, respectively

[Antistatic Agent (B)]

Ionic compound 1: 1-hexyl-3-methylimidazolium hexafluorophosphate (Tokyo Chemical Industries Co., Ltd.)

Ionic compound 2: (N-methyl-N-propylpiperidinium bis (trifluoromethanesulfonyl)imide (Kanto Chemical Co., Inc.), Ionic compound 3: 1-ethylpyridinium bromide (Tokyo Chemical Industries Co., Ltd.)

Ionic compound 4: 1-butyl-3-methylpyridinium trifluoromethanesulfonate (Tokyo Chemical Industries Co., Ltd.)

Lithium salt 1: lithium bis(trifluoromethanesulfonyl)imide (Wako Junyaku Co., Ltd.)

Lithium salt 2: lithium trifluoromethanesulfonate (Wako Junyaku Co., Ltd.)

Lithium salt 3: lithium perchlorate (Wako Junyaku Co., Ltd.)

[Silane Coupling Agent (C)]

Silane coupling agent: 3-glycidoxypropylmethyldiethoxysilane (KBM-403, Shin-etsu Chemical Co., Ltd.)

[Benzotriazole Group Containing Compound (D)]

D-1: 1,2,3-benzotriazole (B0094, Tokyo Chemical Industries Co. Ltd.)

D-2: 1-(methoxy methyl)-1H-benzotriazole (M1276, Tokyo Chemical Industries Co. Ltd.)

D-3: 1-(formamidomethyl)-1H-benzotriazole (F0339, Tokyo Chemical Industries Co. Ltd.)

[Cross-Linking Agent (E)]

E-1: trimethylolpropane/tolylene diisocyanate (CORONATE L, Nippon Polyurethane Industries Co., Ltd.)

E-2: N,N,N',N'-tetraglycidyl-m-xylenediamine (TETRAD-X, Mitsubishi Gas Chemical Company, Ltd.)

[Multifunctional (meth)acrylate Monomer (F)]

F-1: trimethylolpropane triacrylate (LIGHT ACRYLATE TMP-A, Kyoeisha Chemical Co., Ltd.)

F-2: triethylene glycol diacrylate (LIGHT ACRYLATE 3EG-A, Kyoeisha Chemical Co., Ltd.)

[Active Energy-Ray Initiator (G)]

Photo polymerization initiator: diphenyl(2,4,6-trimethylbenzoyl)phosphine oxide (DAROCUR TPO, Chiba Specialty Chemicals Co., Ltd.)

Next, the surface resistance, corrosion resistance, light leakage resistance, durability, adhesion, cohesion to a substrate, adherend contamination properties, low-temperature stability, reworkability, and gel content were evaluated as follows.

<Surface Resistance>

Surface resistance of each polarizing plate with the adhesive layer was measured ($\Omega$/sq) using a micro-electrometer (Kawaguchi Electric Works Co., Ltd.) at 23° C. under 50% RH atmosphere.

<Corrosion Resistance>

Aluminum foil was attached to a surface of each polarizing plate with an adhesive layer and left at 60° C. under 90% RH atmosphere for 2 days, followed by observation of corrosion. In Table 4, no change in the adhesive layer is indicated by 'O,' while whitening of the adhesive layer is indicated by 'X.'

<Light Leakage Resistance>

Each polarizing plate with the adhesive layer was cut into a 120 mm (MD direction of a polarizing plate)×60 mm piece to prepare a sample 1. Further, each polarizing plate with an adhesive layer was cut into a 120 mm (TD direction of a polarizing plate)×60 mm piece to prepare a sample 2. The samples 1 and 2 were attached to both sides of a glass substrate and subjected to autoclave treatment at 50° C. and 0.49 mPa (5 kg/cm$^2$) for 20 minutes. Then, the glass substrate was placed at 80° C. for 120 hours, and the appearance thereof was observed. In Table 4, no appearance of light leakage is indicated by 'O,' while appearance of light leakage is indicated by 'X.'

<Durability>

Each polarizing plate with the adhesive layer was cut into a 120 mm (MD direction of a polarizing plate)×60 mm piece to prepare a sample. The sample was attached to one side of a glass substrate and subjected to autoclave treatment at 50° C. and 0.49 mPa (5 kg/cm$^2$) for 20 minutes. Then, the glass substrate was placed at 100° C. or 60° C./90% RH for 120 hours, and the appearance thereof was observed. In Table 4, no appearance of bubbles, separation, or release under any condition is indicated by 'O,' while appearance of bubbles, separation, or release under any condition is indicated by 'X.'

<Adhesion>

Adhesion of each polarizing plate with the adhesive layer was measured by JIS Z0237. That is, each polarizing plate with the adhesive layer was cut into a 25 mm-width sample. The sample was attached to a glass substrate and subjected to autoclave treatment at 50° C. and 0.49 mPa (5 kg/cm$^2$) for 20 minutes. Then, the adhesion (N/25 mm) of the glass substrate was measured using a tensile tester at a stripping speed of 0.3 m/min at a stripping angle of 180° (under 23° C./50% RH).

<Cohesion to Substrate>

Each polarizing plate with the adhesive layer was treated by the same process as in the measurement of adhesion to measure cohesion to the glass substrate when measuring the adhesion. In Table 4, the polarizing plate including no released potion from the glass substrate is indicated by 'O,' while the polarizing plate including a released portion from the glass substrate is indicated by 'X.'

<Adherend Contamination Properties>

Each polarizing plate with the adhesive layer was treated by the same process as in the measurement of adhesion to measure a contact angle of the glass substrate before and after measuring the adhesion. In Table 4, no change in the contact angle of the glass substrate before and after the measurement of adhesion is indicated by 'O,' while a change in the contact angle of the glass substrate before and after the measurement of adhesion is indicated by 'X.'

<Low-Temperature Stability>

Each polarizing plate with the adhesive layer was cut into a 120 mm (MD direction of a polarizing plate)×60 mm piece to prepare a sample. The sample was attached to a glass substrate and subjected to autoclave treatment at 50° C. and 0.49 mPa (5 kg/cm$^2$) for 20 minutes. Then, the glass substrate was placed at −40° C. for 120 hours, and the appearance thereof was observed. In Table 4, no appearance of bubbles, separation, release, and recrystallized components is indicated by 'O,' while appearance of bubbles, separation, release and recrystallized components is indicated by 'X.'

<Reworkability>

Each polarizing plate with the adhesive layer was treated by the same process as in the measurement of adhesion to observe release conditions when measuring adhesion. In Table 4, appearance of interface failure is indicated by 'O,' while appearance of cohesive failure and/or electro-deposition on the glass substrate (adherend) is indicated by 'X.'

<Gel Content>

In Examples 1 to 10 and Comparative Examples 1 to 9, the adhesive layer was formed on a polyester film which underwent stripping treatment instead of the polarizing plate and measured in gel content (%) after 1, 3, 5, 7, 10 and 15 days, respectively. In the measurement of gel content, about 0.1 g of the adhesive layer left at 23° C. under a 50% RH atmosphere for some days was taken and defined as $W_1(g)$. This product was put in a sample bottle, and about 30 g of ethyl acetate was added thereto and left for 24 hours. Then, the contents of the bottle were filtered through a 200-mesh stainless steel mesh (weight: $W_2(g)$), and the mesh and the remaining material were dried at 90° C. for 1 hour to measure a whole weight $W_3(g)$. Then, gel content (%) was calculated with the values by the following Equation 2.

$$\text{Gel content (\%)}=(W3-W2)/W1\times100 \qquad \text{Equation 2}$$

Referring to Table 4, it may be seen that the adhesive compositions 1 to 10 and the polarizing plates 1 to 10 using the same according to Examples 1 to 10 exhibited not only superior durability but excellent antistatic properties and corrosion resistance, as compared with those according to Comparative Examples 1 to 9.

By way of summation and review, static electricity may occur anywhere. The accumulation of static electricity have various effects during the processing and use of industrial products and industrial materials. For example, the accumulation of static electricity may cause an object to attract dust or dirt, resulting in contamination in manufacturing industrial products or deterioration in performance of a product.

One way of controlling the accumulation of static electricity may include using an antistatic agent. The application of an optically transparent antistatic adhesive to an optical film may facilitate the prevention of static electricity. The antistatic agent may act to eliminate the accumulation of static electricity, and its effect may be effectively measured by surface resistance.

A method of applying an antistatic agent to an optical member may include forming an antistatic layer of a UV curable acrylic resin mixed with metal-oxide particles on a polarizing plate. An antistatic adhesive sheet may include an antistatic layer containing a quaternary ammonium salt formed on a plastic substrate and an adhesive layer thereon.

An adhesive for a polarizing plate may be formed by irradiation of active energy beams to an adhesive material containing an acrylic copolymer and an active energy-ray curable compound.

An adhesive sheet with an adhesive layer containing an antistatic agent may include an antistatic agent of a polyether polyol compound and an alkaline metal salt added to an acrylic adhesive in order to prevent the antistatic agent from reaching a surface of the adhesive sheet. However, an antistatic element $LiClO_4$ has high corrosion properties, and thus when an adhering surface is in direct contact with metal, the antistatic agent may corrode the metal. In particular, when an adhesive composition is applied to an optical member, such as a liquid crystal module, this phenomenon often occurs in the liquid crystal module that has an outer periphery fixed by a frame of metal, e.g. stainless steel, aluminum, and the like, what is called a "bezel". Thus, in such application, the bezel may be corroded by the adhesive composition, so that the application of the adhesive composition is limited.

The embodiments provide an adhesive composition forming an adhesive layer, which does not deteriorate optical characteristics of an optical sheet and has good antistatic performance, and an optical member using the same.

Another embodiment provides an adhesive composition which forms an adhesive layer with good antistatic performance (low surface resistance) and corrosion resistance (rust resisting properties), and an optical member using the same.

Thus, according to an embodiment, an antistatic agent of an ionic compound and/or lithium salt and a benzotriazole group containing compound may be added to a (meth)acrylic ester adhesive composition, thereby forming an adhesive composition with excellent antistatic performance (low surface resistance) and superior corrosion resistance (rust resisting properties).

The adhesive composition of an embodiment exhibits excellent antistatic performance (low surface resistance) and corrosion resistance (rust resisting properties). Thus, the use of the adhesive composition facilitates the production of an adhesive layer which does not deteriorate optical characteristics of an optical sheet and has good antistatic performance and corrosion resistance. Therefore, the adhesive composition may be effective in adhesion to an adherend, e.g., a variety of plastic films, and particularly a polarizing film formed of the adhesive compositions demonstrates excellent light leakage resistance, antistatic properties, and rust resisting properties.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition, comprising:
   100 parts by weight of a polymer prepared by polymerization of (meth)acrylic ester containing monomers;
   0.01 to about 3 parts by weight of an antistatic agent containing an ionic compound and/or a lithium salt;
   0 to about 1 part by weight of a silane coupling agent; and
   about 3 to about 20 parts by weight of a benzotriazole group containing compound represented by at least one of the following Formulae II to V; and
   about 0.05 to about 5 parts by weight of a cross-linking agent, or
   about 3 to about 30 parts by weight of a multifunctional (meth)acrylate monomer, and 0 to about 5 parts by weight of an active energy-ray initiator; and
   wherein the adhesive composition has a surface resistance of less than about $1 \times 10^{10}$ ($\Omega$/sq) when the adhesive composition is applied to a substrate:

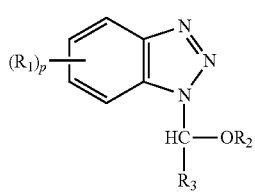
[Formula II]

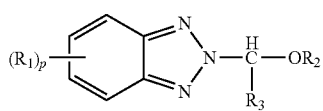
[Formula III]

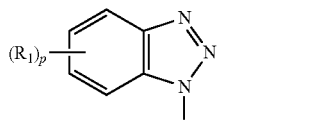
[Formula IV]

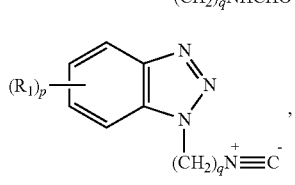
[Formula V]

wherein each $R_1$ independently represents a C1-4 alkyl or halogen, p is from 0 to 4; $R_2$ represents at least one of a C1-12 alkyl, a C5-7 cycloalkyl, a C5-7 cycloalkyl substituted by one to three C1-4 alkyl groups, and a C5-7 cycloalkyl-substituted C1-4 alkyl; $R_3$ represents at least one of hydrogen, a C1-12 alkyl, a C5-7 cycloalkyl, a C5-7 cycloalkyl substituted by one to three C1-4 alkyl groups, a C5-7 cycloalkyl-substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

2. The adhesive composition as claimed in claim 1, wherein the benzotriazole group containing compound represented by one of Formulae II to V is represented by one of the following compounds:

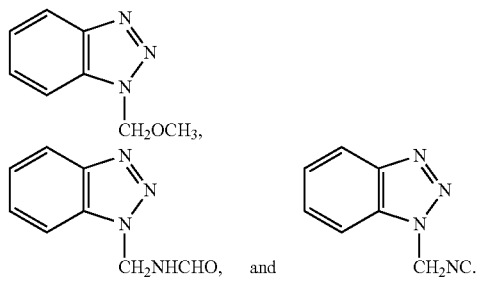

3. An optical member comprising an adhesive layer prepared from the adhesive composition as claimed in claim 1.

4. The optical member as claimed in claim 3, wherein the benzotriazole group containing compound represented by one of Formulae II to V is represented by one of the following compounds:

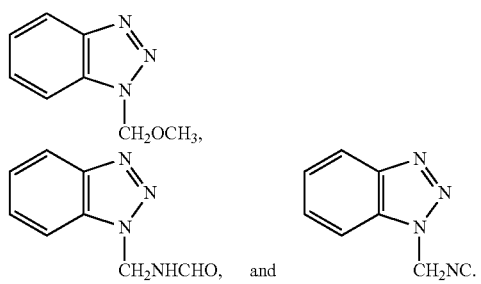

5. An adhesive composition, comprising:
   100 parts by weight of a polymer prepared by polymerization of (meth)acrylic ester containing monomers;
   0.01 to about 3 parts by weight of an antistatic agent containing an ionic compound and/or a lithium salt;
   0 to about 1 part by weight of a silane coupling agent; and
   about 3 to about 20 parts by weight of a benzotriazole group containing compound represented by at least one of the following Formulae II to V; and at least one of:
   about 0.05 to about 5 parts by weight of a cross-linking agent, and
   about 3 to about 30 parts by weight of a multifunctional (meth)acrylate monomer; and
   wherein the adhesive composition has a surface resistance of less than about $1 \times 10^{10}$ ($\Omega$/sq) when the adhesive composition is applied to a substrate:

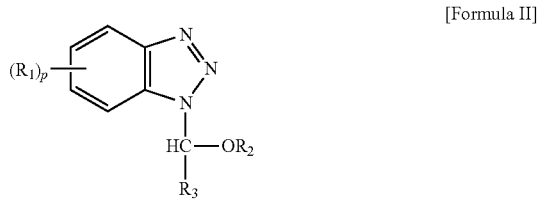
[Formula II]

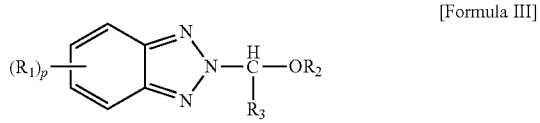
[Formula III]

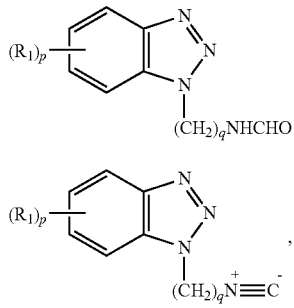

[Formula IV]

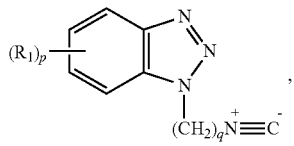

[Formula V]

wherein each R₁ independently represents a C1-4 alkyl or halogen, p is from 0 to 4; R₂ represents at least one of a C1-12 alkyl, a C5-7 cycloalkyl, a C5-7 cycloalkyl substituted by one to three C1-4 alkyl groups, and a C5-7 cycloalkyl- substituted C1-4 alkyl; R₃ represents at least one of hydrogen, a C1-12 alkyl, a C5-7 cycloalkyl, a C5-7 cycloalkyl substituted by one to three C1-4 alkyl groups, a C5-7 cycloalkyl- substituted C1-4 alkyl, a phenyl, a phenyl-C1-4 alkyl, a phenyl substituted by one to three C1-4 alkyl groups, and a phenyl-C1-4 alkyl substituted by one to three C1-4 alkyl groups; and q is 1 to 3.

6. The adhesive composition as claimed in claim 5, wherein the composition includes the multifunctional (meth) acrylate monomer and further includes an active energy-ray initiator, the active energy-ray initiator being present in an amount of up to about 5 parts by weight.

7. The adhesive composition as claimed in claim 5, wherein the benzotriazole group containing compound represented by one of Formulae II to V is represented by one of the following compouds:

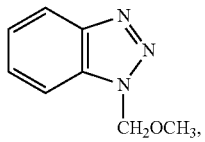

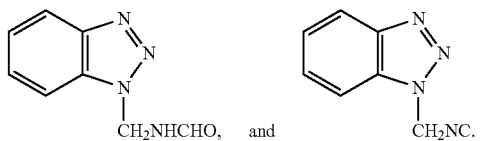

8. An optical member comprising an adhesive layer prepared from the adhesive composition as claimed in claim 5.

9. The optical member as claimed in claim 8, wherein the benzotriazole group containing compound represented by one of Formulae II to V is represented by one of the following compounds:

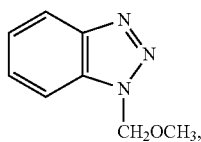

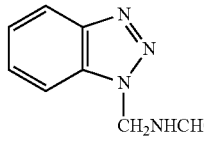 and 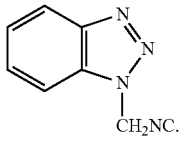

10. The adhesive composition as claimed in claim 1, wherein the adhesive composition comprises greater than 10 and less than about 20 parts by weight of the benzotriazole group containing compound.

11. The adhesive composition as claimed in claim 5, wherein the adhesive composition comprises greater than 10 and less than about 20 parts by weight of the benzotriazole group containing compound.

* * * * *